US011240021B2

(12) United States Patent
Lee

(10) Patent No.: US 11,240,021 B2
(45) Date of Patent: *Feb. 1, 2022

(54) MULTI-ADDRESS POPULATION BASED ON SINGLE ADDRESS

(71) Applicant: Ballet Global Inc., Las Vegas, NV (US)

(72) Inventor: Bobby Christopher Lee, Las Vegas, NV (US)

(73) Assignee: Ballet Global Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/945,240

(22) Filed: Jul. 31, 2020

(65) Prior Publication Data

US 2021/0006399 A1    Jan. 7, 2021

Related U.S. Application Data

(63) Continuation of application No. 16/739,998, filed on Jan. 10, 2020, now Pat. No. 10,917,238, which is a
(Continued)

(51) Int. Cl.
*H04L 29/06* (2006.01)
*G06F 21/60* (2013.01)
(Continued)

(52) U.S. Cl.
CPC .......... *H04L 9/0877* (2013.01); *G06K 7/1417* (2013.01); *G06K 19/06037* (2013.01);
(Continued)

(58) Field of Classification Search
CPC ....... H04L 9/0877; H04L 9/0866; H04L 9/30; G06Q 20/3674; G06K 7/1417
(Continued)

(56) References Cited

U.S. PATENT DOCUMENTS

| 4,637,634 A | 1/1987 | Troy et al. |
| 5,362,106 A | 11/1994 | Longtin |

(Continued)

FOREIGN PATENT DOCUMENTS

| EP | 1997643 B1 | 2/2012 |
| JP | 10-214320 A | 8/1998 |

(Continued)

OTHER PUBLICATIONS

Notice of Allowance in related U.S. Appl. No. 16/568,182 (7 pages).

(Continued)

*Primary Examiner* — Izunna Okeke
(74) *Attorney, Agent, or Firm* — Pillsbury Winthrop Shaw Pittman, LLP

(57) ABSTRACT

A physical card (in some cases without any on-board source of power or computing capabilities) is configured to maintain access information for digital bearer assets. The physical card may include disposed thereon a single address operable to receive digital bearer assets in one or more transactions on a decentralized computing platform, like a blockchain-based decentralized computing platform. Other decentralized computing platforms utilize different address generation protocols, thus preventing use of a single address on those other platforms. A set of addresses is generated, each address corresponding to a given decentralized computing platform. Each address is based on a same underlying key-pair, and a primary address is selected from the set for a given card. The remaining addresses in the set are stored, without storage of the public key or private key, and returned in a response to a request for additional addresses of the currency card.

23 Claims, 15 Drawing Sheets

Related U.S. Application Data continuation of application No. 16/568,185, filed on Sep. 11, 2019, now Pat. No. 10,554,401.

(60) Provisional application No. 62/870,866, filed on Jul. 5, 2019.

(51) Int. Cl.

| | |
|---|---|
| *H04L 9/08* | (2006.01) |
| *G06Q 20/36* | (2012.01) |
| *H04L 9/30* | (2006.01) |
| *G06K 7/14* | (2006.01) |
| *G06K 19/06* | (2006.01) |
| *G06Q 20/06* | (2012.01) |
| *G09F 3/02* | (2006.01) |
| *G09F 3/00* | (2006.01) |
| *G09F 3/10* | (2006.01) |
| *G06Q 20/34* | (2012.01) |
| *H04L 9/06* | (2006.01) |

(52) U.S. Cl.
CPC ....... *G06Q 20/0658* (2013.01); *G06Q 20/357* (2013.01); *G06Q 20/3674* (2013.01); *G09F 3/02* (2013.01); *G09F 3/0292* (2013.01); *G09F 3/0297* (2013.01); *G09F 3/10* (2013.01); *H04L 9/0618* (2013.01); *H04L 9/0866* (2013.01); *H04L 9/30* (2013.01); *H04L 9/3073* (2013.01); *G09F 2003/0213* (2013.01); *G09F 2003/0263* (2013.01); *G09F 2003/0277* (2013.01)

(58) Field of Classification Search
USPC ........ 713/171, 172, 194, 162; 380/277, 285, 380/45, 30
See application file for complete search history.

(56) References Cited

U.S. PATENT DOCUMENTS

| | | | |
|---|---|---|---|
| 6,109,529 A | 8/2000 | Nelson, Jr. | |
| 6,199,757 B1 | 3/2001 | Kubert | |
| 6,214,443 B1 | 4/2001 | Palmasi | |
| 6,358,607 B1 | 3/2002 | Grotzner | |
| 6,777,054 B1 | 8/2004 | Roth | |
| 7,328,844 B2 | 2/2008 | Workens | |
| 10,554,401 B1 | 2/2020 | Lee | |
| 2009/0152861 A1 | 6/2009 | Kresse | |
| 2011/0155313 A1* | 6/2011 | Black | G09F 3/0292 156/249 |
| 2011/0266350 A1 | 11/2011 | Chapman | |
| 2014/0035720 A1 | 2/2014 | Chapman | |
| 2015/0079326 A1 | 3/2015 | Snow | |
| 2015/0220914 A1 | 8/2015 | Purves et al. | |
| 2015/0269375 A1 | 9/2015 | Chapman | |
| 2016/0125088 A1 | 5/2016 | Sheedy | |
| 2016/0260091 A1* | 9/2016 | Tobias | G06Q 20/3678 |
| 2017/0032231 A1 | 2/2017 | Chapman | |
| 2017/0243098 A1 | 8/2017 | Pascua | |
| 2017/0344988 A1 | 11/2017 | Cusden et al. | |
| 2018/0194153 A1 | 7/2018 | Semenuk | |
| 2019/0001734 A1 | 1/2019 | Meier | |
| 2021/0005114 A1 | 1/2021 | Lee | |

FOREIGN PATENT DOCUMENTS

| | | |
|---|---|---|
| KR | 10-2016-0119296 A | 10/2016 |
| WO | 01-57792 A1 | 8/2001 |
| WO | 2007106278 A2 | 9/2007 |

OTHER PUBLICATIONS

Non-Final Office Action in related U.S. Appl. No. 16/568,184 (10 pages).
Non-Final Office Action in related U.S. Appl. No. 16/568,182 dated Aug. 18, 2020 (7 pages).
Notice of Allowance in related U.S. Appl. No. 16/739,998 dated Oct. 1, 2020 (13 pages).
Notice of Allowance in related U.S. Appl. No. 16/714,433 dated Oct. 5, 2020 (13 pages).
International Search Report and Written Opinion in related International Application No. PCT/US2020/040823 dated Oct. 7, 2020 (10 pages).
International Search Report and Written Opinion in related International Application No. PCT/US2020/040824 dated Oct. 7, 2020 (10 pages).
International Search Report and Written Opinion in related International Application No. PCT/US2020/040822 dated Oct. 21, 2020 (19 pages).
Notice of Allowance in related U.S. Appl. No. 16/568,184 dated Jun. 23, 2021.

* cited by examiner

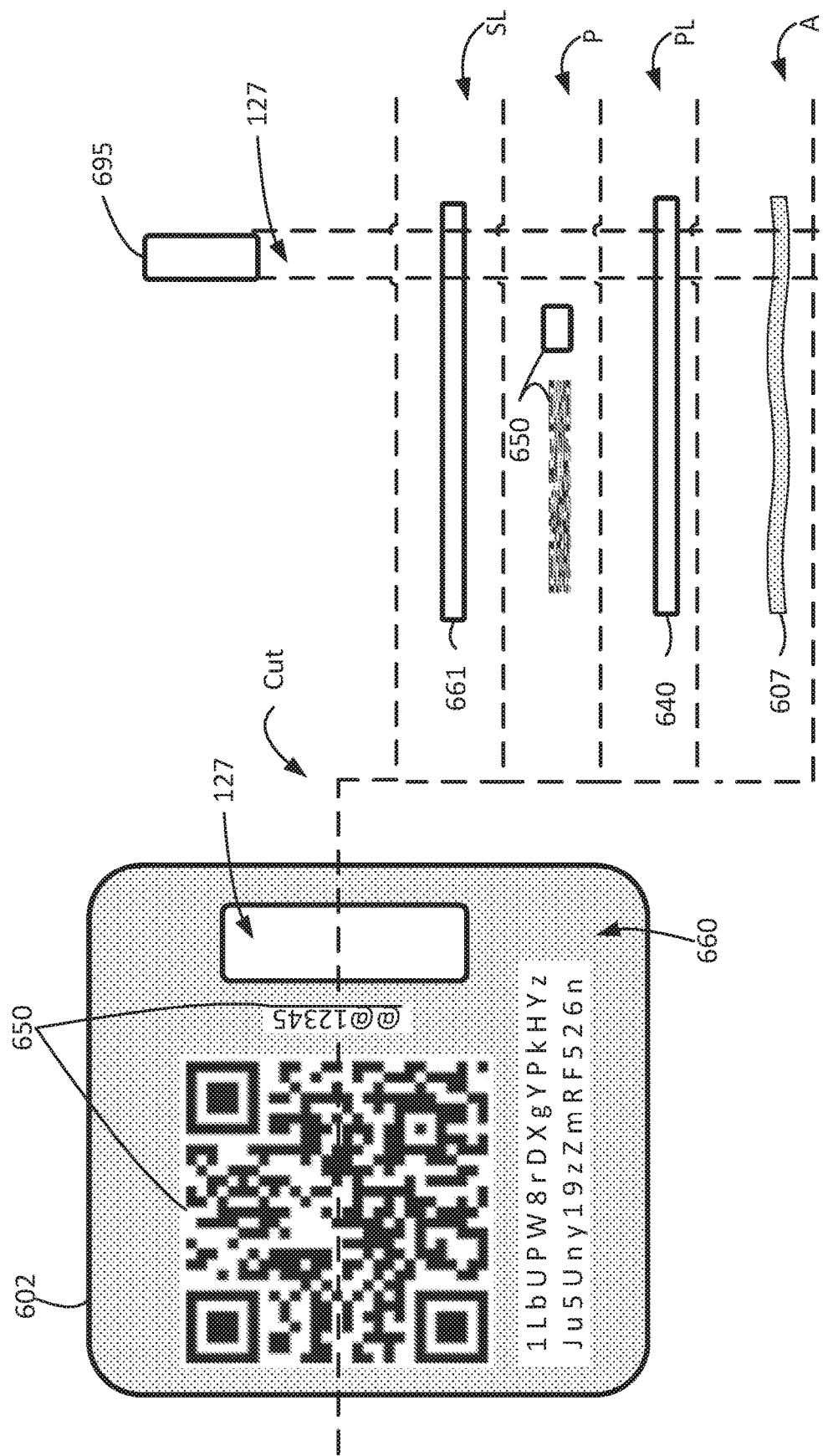

MULTI-ADDRESS POPULATION BASED ON SINGLE ADDRESS

CROSS-REFERENCE TO RELATED APPLICATIONS

This application is a continuation of U.S. Non-Provisional patent application Ser. No. 16/739,998, titled MULTI-ADDRESS POPULATION BASED ON SINGLE ADDRESS, filed on 10 Jan. 2020, which is a continuation of U.S. Non-Provisional patent application Ser. No. 16/568,185 (U.S. Pat. No. 10,554,401), titled MULTI-ADDRESS POPULATION BASED ON SINGLE ADDRESS, filed on 11 Sep. 2019, which claims the benefit of U.S. Provisional Patent Application 62/870,866, titled PHYSICAL, TAMPER-EVIDENT CRYPTOCURRENCY CARD, filed on 5 Jul. 2019. The entire content of each aforementioned patent filing is hereby incorporated by reference.

BACKGROUND

1. Field

The present disclosure relates generally to hardware accessories for managing digital bearer assets and more specifically to a physical, tamper-evident card for storing credentials corresponding to an address included on the card, where those credentials also correspond to multiple other addresses which are populated in a wallet of a user demonstrating access to the card.

2. Description of the Related Art

Decentralized computing systems are used to generate assets, like a digital currency or, more generally, digital assets that may include coins, tokens, and the like, often within a complicated multi-actor online ecosystem. Like physical currencies and commodities, some digital assets may exhibit similar properties including having an associated value, rivalrousness, and fungibility (or in some cases, like ERC 721 tokens, non-fungibility). Often, decentralized computing platform can allow for investment and transfer-of-ownership of assets between participants. Although many people currently engage with such platforms, the barrier to entry is relatively high due to the complicated nature of the systems and the absence of mature, well designed user interfaces to abstract away that complexity. Specifically, current currency (a term used herein to refer generally to digital bearer assets, like cryptocurrency, utility tokens, and the like) management systems are relatively technical in nature and their failure modes deter many less sophisticated users who would otherwise wish to access decentralized computing platforms.

Examples of existing currency management systems include powered hardware devices with integrated logic, such as a mobile phone or USB key-like device for storing secret keys backing user cryptographic currency accounts. Such schemes are commonly known as hardware wallets, which often store private and public (or other or addresses) cryptographic keys of accounts on various decentralized computing platforms, often also referred to as wallets (but without the "hardware" qualifier). With these wallets, users of a platform transact (e.g., send, receive, loan, borrow, subject to security interests, release security interests) in digital bearer assets (e.g., exchange ownership of an asset or amount of an asset). Users often backup their secret key(s), such as on an RFID backup card or physical sheet of paper, which provides a volatile failure point. Other backups, such as online, or other redundant measure, increases the attack surface for nefarious actors to gain access to secret keys. Should a nefarious user gain access to a secret key backing a cryptographic currency account, that nefarious user may liquidate the totality of that account without user recourse. Accordingly, there are complicated considerations and tradeoffs concerning the security and back-up of those secret keys. Unsophisticated users face difficulty in navigating these challenges and often choose not to participate in crypto current platforms as a result.

SUMMARY

The following is a non-exhaustive listing of some aspects of the present techniques. These and other aspects are described in the following disclosure.

Some aspects include a metal card with the form factor of a credit card. The card has a tamper-evident sticker with at least two physical layers, one of which is partially concealed by the other. The top, exposed layer includes an optical code (e.g., a QR code) that encodes an address corresponding to a public key of a public-secret (e.g., public-private) key pair of an asymmetric encryption algorithm. A top layer of the sticker may include a window to an underlying layer. Through the window a unique identifier of the key-pair/card from the underlying layer is exposed. The top layer may include a corresponding unique identifier, the identifier being displayed to permit a user to verify the unique identifier of the top layer matches the unique identifier of the exposed portion of the underlying layer. The unique identifier may correspond to a serial number within a namespace of an issuer of the card. In some embodiments, additional unique identifiers (like keys for key-value pairs) are utilized server-side by the issuer, such as to uniquely associate an informational component or combination of information included on a card, which may be cryptographically hashed, with other information in a database. The lower layer of the sticker also includes content that is concealed by the top layer. The top layer of the sticker is configured with a tamper-evident adhesive substrate, lifting of which from a surface the substrate adheres to creates a tamper-evident effect which, by visual inspection, a user can ascertain whether the top layer has been lifted to expose at least a corresponding part of the surface. In some aspects, a portion of the surface adhered to includes the concealed portion of the lower layer. In some aspects, a portion of the surface adhered to includes a front of the metal card substantially surrounding the lower layer. The concealed portion has printed thereon another optical code encoding a cipher text, the plaintext of which is the secret key of the key pair. The ciphertext is encrypted with a symmetric encryption protocol using an encryption key. The metal card may include the encryption key, which may be marked (e.g., engraved) on the metal card. In some aspects, the encryption key is concealed in a tamper-evident manner, such as by a tamper-evident adhesive substrate. The metal card may include a corresponding unique identifier, which may be marked (e.g., engraved) on the metal card, the identifier being displayed to permit a user to verify the unique identifier of the card matches the unique identifiers of both physical layers of the sticker. In some aspects, the public key deterministically resolves to a set of wallet addresses on various decentralized computing platforms, from which funds can be withdrawn given the private key, the top layer displaying at least one optical code corresponding to at least one of the wallet addresses.

Some aspects include an apparatus comprising a physical card having a surface area of a first size corresponding to a face of the card; a sticker comprising a plurality of layers, the plurality of layers comprising: a first adhesive layer having a surface area of a second size less than the first size, the first adhesive layer adhered to a corresponding area on the face of the card; a first print layer having a surface area of approximately the second size, the first print layer disposed above the first adhesive layer and comprising a concealed information portion on which at least some private information is disposed; a second adhesive layer having a surface area of a third size less than the first size and greater than the second size, wherein the second adhesive layer is disposed above the first print layer, covers the concealed information portion of the first print layer, extends beyond the first print layer on at least three sides, and is adhered to a corresponding surface area on the face of the card; and a second print layer having a surface area of approximately the third size, wherein the second print layer is disposed above the second adhesive layer and comprises a public information portion on which at least some public information is disposed; wherein, among the plurality of layers, at least one of the layers disposed above the first print layer comprises means for indicating tampering.

Some aspect include a physical card having a surface area of a first size corresponding to a face of the card, the physical card comprising a first unique identifier and a code; a tamper-evident mask affixed to the face of the card and concealing the code; and a tamper-evident sticker affixed to the face of the card, the tamper-evident sticker comprising: a bottom-component affixed to the face of the card, the bottom-component including a second unique identifier and private access information; and a tamper-evident top-component including: a first portion concealing the private access information and including public access information and a third unique identifier, a second portion enveloping the bottom-component and affixed to the face of the face the card, and a third portion within which the second unique identifier of the bottom-component is visible while the private access information is concealed, wherein a correspondence of values of the unique identifiers indicates a correspondence between the private access information and the public access information.

Some aspects include a multi-component sticker, comprising: a first component, the first component comprising: a first adhesive layer; a first print layer disposed above the first adhesive layer and comprising a concealed information portion on which at least some private information is disposed during a printing of the first print layer and a first public information portion on which an identifier is disposed during the printing of the first print layer; and a second component, the second component comprising: a second adhesive layer disposed above the first print layer and covering the concealed information portion of the first print layer, and extending beyond at least a portion of a perimeter of the first print layer; and a second print layer disposed above the second adhesive layer and comprising a second public information portion on which at least the identifier is disposed during a second process, wherein the second component comprises a tamper-evident feature in at least one layer and a window portion aligned with the first public information portion of the first print layer.

Some aspects include computing infrastructure that works with the card to afford a number of features. Some aspects uniquely associate, server-side, in memory, the unique identifier (or hash thereof) and a portion of the symmetric encryption key (or hash thereof) (e.g., the first four digits).

In some aspects the server exposes an API by which cards can be verified. Some aspects include receiving the portion of the key, the unique identifier, or both, as a request to the API from a user device. In some aspects, the server performs a first verification based on local data. In some aspects, the server performs a second verification based on a decentralized computing platform data. The server may generate a response which reports a verification value. For example, a response to the API request may include a value indicative of whether the values match the set on the card (e.g., returning a binary determination where both are submitted, returning the serial no. if the portion of the key is submitted, or returning the portion of the key if the unique identifier is submitted). In some cases, the server may write the result of a verification to the blockchain or to a local database for the card and initialize a count. The count for verification of a card may be incremented upon each verification request for the card received via the API. In some aspects, for a new currency card, the count indicates that the user is the first to verify the card and, as a result, cannot present the card as new even if a tamper-evident adhesive substrate over the encryption key is replaced.

Some aspects include operations comprising: deterministically generating, with a computer system, a public cryptographic key based on information corresponding to a private cryptographic key, the public cryptographic key and private cryptographic key being members of an asymmetric encryption cryptographic key pair; deterministically generating, with the computer system, a set of addresses based on the public cryptographic key, each of at least a plurality of addresses in the set of addresses corresponding to a different user account of a different decentralized computing platform; selecting, with the computer system, from the set of addresses, a primary address to be depicting on a physical card that also depicts information from which the private cryptographic key is accessible; deterministically generating, with the computer system, a record identifier, the record identifier corresponding to the physical card and being based on information resident on the physical card other than the private key or the public key; storing, with the computer system, within a database, a record associated with the record identifier, the record comprising the set of addresses or information from which the set of addresses is derivable; receiving, with the computer system, from a user computing device, a request for an additional address, the request uniquely identifying the record identifier; and transmitting, with the computer system, to the user device, a response including one or more addresses in the set of addresses different from the primary address.

Some aspects include a system configured to verify authenticity of an article of manufacture, the system comprising: a first computer system to generate deterministic data for one or more components of the article of manufacture, wherein the article of manufacture comprises: a first unique identifier and a code disposed on a first component, a second unique identifier and private access information disposed on a second component, a third unique identifier and public access information disposed on a third component, and the private access information disposed on the second component is concealed with a tamper-evident mask; and a second computer system configured to: obtain a subset of information corresponding to the article of manufacture, the subset of information not providing access to a private key corresponding to the private access information; store, within a database, a record of the article of manufacture based on the subset of information; receive a verification request including a record identifier, the record identifier based on a value of the code of the article of manufacture and another value selected from one or more of a unique identifier or the public access information; request, based on the record identifier, a corresponding record from the database; update, in response to obtaining the record of the article of manufacture, a request count associated with the record; and transmit an indication of the request count in response to the verification request.

Some aspects include a native application for execution on a user mobile device. The native application may interface with an image sensor of the mobile device to scan an optical code. In some aspects, the optical code is the top-layer QR code of a currency card that encodes a cryptocurrency address based on a corresponding public key. In some aspects, the corresponding public key resolves to various wallet addresses on various blockchain networks. In some aspects, the native application queries an API of the server with the QR code to query for one or more additional wallet addresses. In some aspects, the native application displays a UI indicative of wallet balances corresponding to one or more addresses associated with the currency card.

Some aspects include a native application configured to: scan the primary address disposed on the physical card; generate the request without obtaining the private cryptographic key or public cryptographic key corresponding to the physical card; and associate, in response to receiving the response, the one or more addresses in the set of addresses different from the primary address with a wallet account corresponding to the physical card; wherein the native application is further configured to perform one or more operations to: generate a user interface displaying a representation of the physical card and one or more other scanned physical cards; and determine a balance associated with each scanned physical card across a plurality of addresses received for the respective scanned physical card; or receive a selection of a representation of a given scanned physical currency card; and generate a user interface displaying balances for respective addresses associated with the given scanned card.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements:

FIG. 6C, FIG. 6D, FIG. 6E, and FIG. 6F illustrate examples of components of a multi-component sticker, according to some embodiments.

Figure 1A:
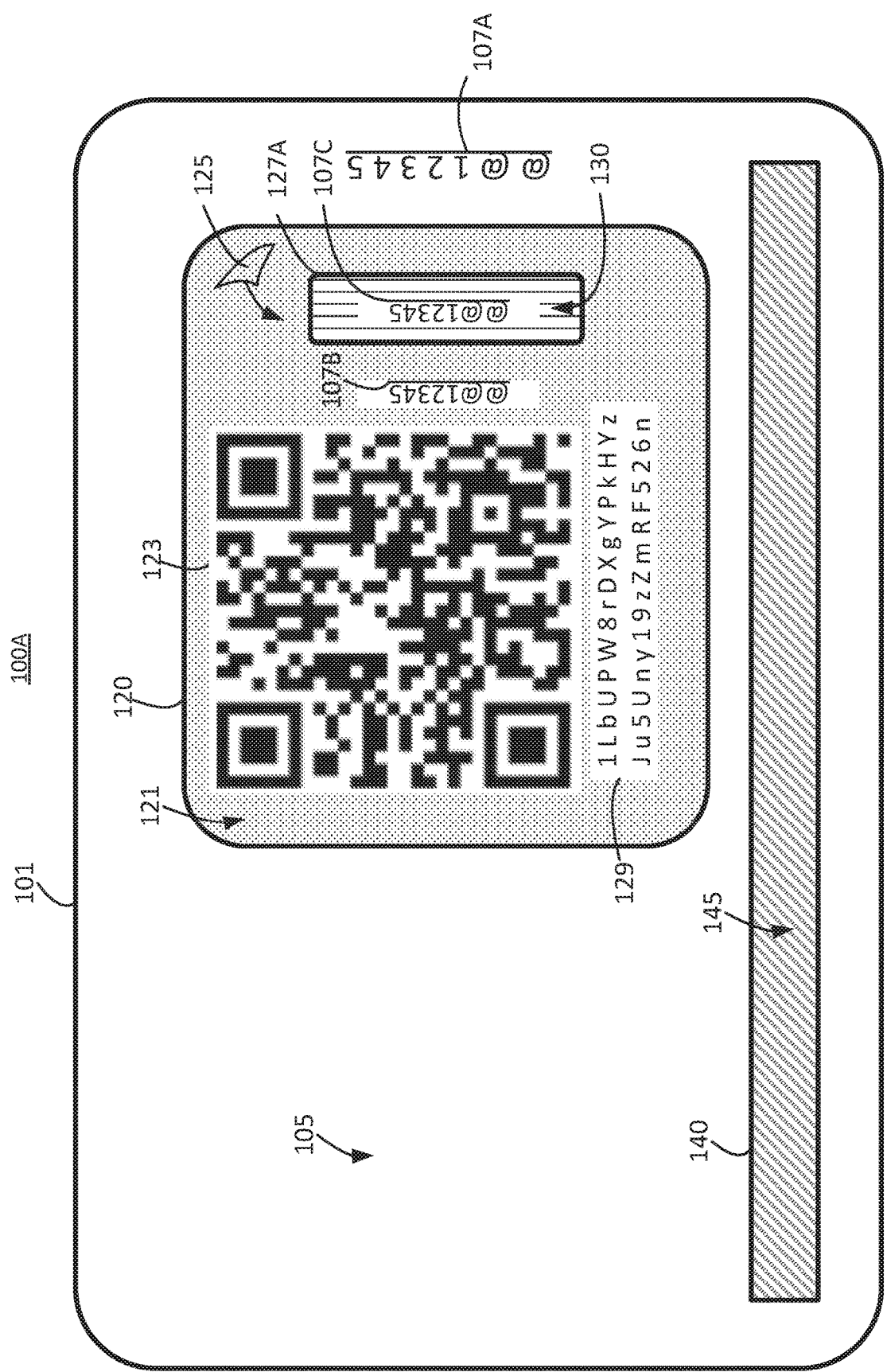
FIG. 1A and FIG. 1B illustrate examples of currency cards including example tamper-evident features and example authenticity verification features, according to some embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of decentralized computing platforms and digital bearer assets. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

In some embodiments, a physical currency card (in some cases without any on-board source of power or computing capabilities) is configured to maintain access information for digital bearer assets. Examples of access information may include a secret, private key having a corresponding public key, like a cryptographic key-pair in an asymmetric encryption algorithm, or representations thereof (like a ciphertext thereof). Access information may further include one or more other encryption keys operable to decrypt a representation of a key of a key pair (like a symmetric key of a symmetric encryption algorithm). In some example embodiments, access information includes a cryptographic hash address, such as a cryptographic hash address operable to receive digital bearer assets, like an account address, an encrypted representation of a private key, such as a private key having a corresponding public key from which the cryptographic hash address is derived, and an encryption key by which the private key is encrypted to generate the encrypted representation thereof. Other variations are also discussed herein.

Various embodiments of the physical card are devised to provide a more robust mechanism than electronic approaches for maintaining access information (which is not to suggest that electronic features or any other subject matter is disclaimed). Examples of electronic approaches may include, but are not limited to (which is not to suggest that other lists herein are limiting), electronic devices based on USB or wireless interfaces and electronically stored keys. Failure of the electronic devices (e.g., through a surge, EMP attack, electromigration, etc.) can render funds irrecoverable if a private key is inaccessible. Printed (a term used broadly to refer to optically readable markings, and which is not limited to application of ink and can include etching or engraving) text has worked for 400+ years and is robust. However, printed text is only as durable as the medium on which it resides and oft prone to fading or inadvertent loss even when a user keeps such written records.

Some embodiments of a physical card include a metal card with the form factor of a credit card, although other form factors may be used. Accordingly, some embodiments include a rectangular physical card approximately 86 mm (~3 and ⅜ inches)×54 mm (~2 and ⅛ inches), such as 85.60 mm×53.98 mm, and which may have rounded corners with a radius of approximately 2.88-3.48 mm, such as to conform to the ISO/IEC 7810 ID-1 standard (described dimensions may be varied plus-or-minus 10% or plus-or-minus 20%, in addition to other expressed ranges). Other example form factors may be a ratio or portion (e.g., half, widthwise or lengthwise) of a form factor of a credit card. In some embodiments, a physical card, such as card having dimensions similar to those described above, is simpler than electronic approaches for less technically sophisticated users. The user experience is physically intuitive and familiar. In addition, a physical card is unlikely to be accidentally discarded or lost. In some cases, the card has a thickness of between 0.1 and 2 mm, like between 0.2 and 1 mm.

In some embodiments, the physical card has a tamper-evident sticker (or pair of stickers) with at least two physical surfaces (e.g., top and bottom surfaces of a single sticker, or top surfaces of a pair of overlaid stickers), one of which is partially concealed by the other. Each surface may have a different, but related code, like a human-readable code or optical code (e.g., a QR code, bar code, or the like, in some cases with redundancy of encoded information in the form of parity bits, Reed-Solomon error correction, Turbo codes, Hamming codes, or the like, in some implementations with sufficient redundancy to recover a damaged bit or byte of encoded information). The top surface may be exposed when the card is an un-accessed state (i.e., before access information corresponding to the private key has been rendered viewable or otherwise accessible to the user) and may include an optical code (e.g., a QR code) that encodes a public key or representation of a public key of a public-private key pair of an asymmetric encryption algorithm. For example, in some embodiments, the optical code may correspond to a cryptographic hash address corresponding to the public key. The cryptographic hash address may be generated from the public key (e.g., via a protocol of a decentralized computing platform, like a blockchain based computing platform, for generating cryptographic hash addresses operable on the platform) and visible in the un-accessed state such that digital bearer assets, like cryptographic currency, tokens, or other assets (e.g., resident or tracked on the platform to which the cryptographic hash address corresponds), may be transferred to the address. In the un-accessed state, at least part of the bottom surface (e.g., all, or more than 20%, more than 50%, or more than 90%) depicting the optical code thereon is concealed (e.g., obfuscated, not visible, not readable, or otherwise inaccessible) by the top surface. The obfuscated optical code may be a different optical code from the un-concealed optical code. In some cases, the optical code on the top surface (also called a top-component of a multi-component sticker herein) encodes a representation (e.g., in plain text or ciphertext form) of a public key of the key pair (e.g., a public key that uniquely corresponds to wallet addresses on one or more decentralized computing system implementations, which may be implemented with blockchain-based protocols). In some cases, the optical code on the concealed surface encodes a representation (e.g., in plain text or ciphertext form) of a private key corresponding to the public key, e.g., from a key pair generated with one of the following classes of asymmetric encryption techniques: Diffie-Hellman; Digital Signature Standard; ElGamal; elliptic curve techniques; RSA, lattice-based cryptography, and the like.

In some embodiments, a user may add digital bearer assets, like cryptographic currency, to an account based on public access information of the exposed top-component while the card is in an un-accessed state, without viewing or otherwise accessing private access information of the concealed bottom-component. Later, when the user wishes to access (e.g., transfer to a recipient wallet or address) those digital bearer assets, the exposed top-component may be removed to reveal the concealed bottom-component, which includes private access information (or portion thereof) operable to transfer those digital assets. In accordance with various embodiments disclosed herein, user experience is drastically simplified over previous implements, a top-component of a multi-component sticker is physically peeled back to reveal a bottom component of the multi-component sticker including a secret. And, by virtue of disclosed embodiments of tamper-evident sticker configurations, loss of secrecy is physically apparent by visual inspection with the naked eye. Moreover, there is no need for a user to remember a set of key recovery passphrases, like those often used with electronic approaches.

Security concerns may be mitigated in various configurations of the tamper-evident sticker and physical card. For example, a top-component of a multi-component sticker may include a hole, channel, or other type of window to an underlying layer, like a bottom-component of the multi-component sticker. Through the window a unique identifier of the access information-card combination disposed on the underlying layer may be visible upon inspection. A corresponding unique identifier may also be disposed on the top-component and visible upon inspection, the identifier being displayed to permit a user to verify the unique identifier corresponding to the top-component matches the unique identifier of the exposed portion of the bottom-component, thereby ensuring a match of public access information to private access information disposed on the respective components. The bottom-component of the multi-component sticker also includes content that is concealed by the top-component. The top-component of the multi-component sticker may be configured with one or more tamper-evident features, such as one or more tamper-evident layers and an adhesive to promote activation of the tamper-evident features. For example, lifting of the top-component from a surface to which it adheres may promote a tamper-evident effect in a feature which, by visual inspection, a user can ascertain whether the top-component has been lifted to expose at least a corresponding part of an underlaying surface. In some embodiments, the tamper-evident effect of a feature is selectively promoted based on the surface to which it adheres. In some embodiments, a first portion of the surface to which the top-component is adhered to includes a front portion of the physical card and substantially surrounds the bottom-component. In some embodiments, a second portion of the surface to which the top-component is adhered to includes the concealed portion of the bottom-component. In some embodiments, the adhesive adheres with a first strength to the concealed portion and adheres with a second strength to the physical card, the first strength being less than the second strength. In some embodiments, the first strength does not activate any tamper-evident feature of the top-component. In some embodiments, the first strength is great enough to activate a first one (or more) tamper-evident feature of the top-component but weak enough to not activate a second one (or more) tamper-evident feature of the top-component. In other words, in some embodiments, the first strength may selectively activate at least a first tamper-evident feature but not at least one other tamper-evident feature. In some embodiments, the first strength weak enough to substantially prevent adhesive residue. In some embodiments, the second strength is great enough to activate at least a first tamper-evident feature of the top-component. In some embodiments, the second strength is great enough to activate an at least one other tamper-evident feature not activated at the first strength. In some embodiments, the second strength is great enough to substantially cause adhesive residue to remain adhered to the physical card.

In some embodiments, the concealed portion has printed thereon another optical code encoding a ciphertext, the plaintext of which is a secret key of a key pair. In some embodiments, the ciphertext is generated by encryption of the plaintext with a symmetric encryption protocol using an encryption key. Thus, for example, the encryption key is like a passphrase by which private access information in ciphertext can be decrypted to obtain private access information in plaintext. The physical card may include the encryption key, which may be marked (e.g., engraved) on the physical card. In some embodiments, such as in embodiments where the bottom-component includes ciphertext of plaintext private access information, a unique identifier (e.g., corresponding to a same unique identifier visibly disposed on a top-component and visibly, via a window of the top-component, disposed on the bottom-component) may be similarly marked (e.g., engraved) on the physical card, thereby ensuring a match of the private access information (in ciphertext) to an encryption key (e.g., like a passphrase) disposed on the physical card that is operable to decrypt the ciphertext to generate plaintext private access information. The unique identifier may correspond to a serial number within a namespace of an issuer of the card. In some embodiments, the encryption key is concealed in a tamper-evident manner, such as by a tamper-evident mask (e.g., like a sticker, which may have multiple layers) concealing the engraving of the encryption key. In some embodiments, the tamper-evident mask may include a layer that is scratched-off or one or more layers that are peeled-off to reveal, with a tamper-evident effect, the underlying encryption key on the physical card, thus indicating to a user whether the encryption key has been accessed by another party. In some embodiments, the encryption key is operable to decrypt the ciphertext by a corresponding symmetric decryption protocol to reveal the plaintext of the secret key of the keypair. Thus, in some example embodiments, a user must activate at least one tamper-evident feature corresponding to a portion of a tamper-evident top-component of the sticker to reveal the ciphertext and activate at least one tamper-evident feature corresponding to a portion of the tamper-evident mask to reveal the encryption key in order to ascertain the private access information (e.g., a secret key) in plaintext.

Further, in some embodiments, a physical currency card product is robust to supply chain attacks. In some embodiments, a manufacturer of a tamper-evident sticker, like a tamper-evident multi-component sticker having a top-component including public access information and a bottom-component including private access information concealed by the top-component, may never have access to the plaintext of the private key because an encrypted representation thereof is supplied to the manufacturer as the private access information. In other words, having access to a ciphertext representation of a private key alone is insufficient to obtain (e.g., access) the private key in plaintext. Moreover, the manufacturer of the sticker need not take possession of a physical card blank corresponding to a sticker, let alone a physical card blank marked with the symmetric encryption key needed to decrypt the ciphertext of the private key that is included on the bottom-component. Accordingly, the manufacturer of the sticker cannot ascertain the private access information corresponding to the public access information (or even the public key when a cryptographic hash address is supplied as public access information). Similarly, a card blank manufacturer need not take possession of stickers and is therefore prevented from utilizing any encryption key in a nefarious manner. In some embodiments, security may be increased by a final engraving step performed by the card issuer (or even another party subsequent to application of a sticker to a card blank) rather than the card blank manufacturer. Thus, for example, in some embodiments, even collusion between both a sticker manufacturer and a card blank manufacturer may be insufficient to nefariously gain access to a secret key generated by a card issuer. Moreover, private keys, ciphertext of private keys, and encryption keys may be maintained separately and discarded, in some cases in stages, to prevent exposure of combinations of data that a nefarious party could utilize to infer private access information (e.g., a plaintext private key).

In some embodiments, a physical card may include a corresponding unique identifier, which may be marked (e.g., engraved) on the metal card, the identifier being displayed to permit a user to verify the unique identifier of the card matches the unique identifiers of both components of a multi-component sticker. Further, an issuer of the card (or other party) may utilize the identifiers to match a sticker with a corresponding card, which, in some embodiments, may match up deterministic information. For example, in some embodiments, a public key deterministically resolves to a set of wallet addresses, each of which may corresponding to different decentralized computing platforms from which funds can be withdrawn given a corresponding private key. Once an issuer derives the set of addresses, the public key may be discarded (in addition to the private key and encryption key) and a wallet address corresponding to an optical code disposed on a component of the multi-component sticker may be associated the other wallet addresses in the set.

In some embodiments, a physical card may have disposed thereon information by which a user can verify authenticity of the card or other information disposed thereon. For example, in some embodiments, an issuer (or other entity) may maintain a database and provide an interface by which a user who obtains a physical card may verify authenticity of the card by confirming via the database that a portion of the encryption key (e.g., a symmetric key utilized to encrypt a private key) matches the unique identifier corresponding to the card or the multi-component sticker. As described above, in some embodiments, a unique identifier may be visible on at least two components of the multi-component sticker and further visible on the physical card, mitigating the risk of counterfeit card makers supplying cards with less robust security features (or configured to divert digital bearer asset transfers to a cryptographic hash address that a nefarious party controls). In some embodiments, verification does not rely on the entire encryption key, but rather a portion thereof to preserve the remaining portion as an additional form of tamper-evidence that remains intact until access of digital bearer assets is desired.

Embodiments of a physical card may be both robust and affordable so that users can budget by allocating different digital bearer assets or amounts thereof to different disposable cards, and upon withdrawal of at least some funds, the remainder can be migrated to a new cryptographic hash address or different cryptographic hash addresses in a set of cryptographic hash addresses (e.g., a wallet) corresponding to a new, physical card. In some embodiments, a physical card is made of metal or includes a metal backing, or metal insert, or metal face of the card, or other material that impedes attacks by which scanning equipment is used to try to image information otherwise concealed by tamper-evident material. In some embodiments, one or more stickers disposed on the physical card as described herein include metal flakes, inserts, or other material that similar impedes such attacks.

Some embodiments include computing infrastructure configured to support one or more features pertaining to utility of a physical card that maintains access information for digital bearer assets. Some embodiments include a server system that uniquely associates, server-side, in memory, the unique identifier (or hash thereof) and a portion of a passphrase, like an encryption key, such as a symmetric encryption key or hash thereof (e.g., the first four values). In some embodiments the server system exposes an API by which issued physical cards can be verified. For example, either via an online interface or via a native application on a mobile device, a user may query the server with an API request to verify authenticity of a card and whether another party has previously checked verification of the card (e.g., which could indicate that the card has been compromised). Notably, a user may perform such a check prior to transferring digital bearer assets to the card. In some embodiments, a server system having an API is configured to receive a request including information such as the portion of the passphrase, the unique identifier, or both, as a request to the API from a user device. In some embodiments, the server performs a first verification based on local data. In some embodiments, the server performs a second verification based on a decentralized computing platform data (e.g., in some embodiments the server may publish a count indicative of verifications performed on a physical card to an immutable data store of the decentralized computing platform). For example, the server may perform a verification to determine whether a cryptographic hash address associated with the card has been previously utilized (and which a user may optionally perform based on public access information that is visible without activating a tamper evident feature).

Embodiments of the server system may generate a response to an API request which reports a verification value (or values). For example, a response to the API request may include a value indicative of whether information provided in a request matches a combination corresponding to a valid issued card (e.g., returning a binary determination where both a portion of the passphrase and unique identifier are submitted, returning the unique identifier if the portion of the passphrase is submitted, or returning the portion of the passphrase if the unique identification number is submitted). In some cases, the server may write the result of a verification performed on a physical card to an immutable data store (e.g., a blockchain) of a decentralized computing platform or to a local database and initialize a verification count or increment the verification count corresponding the physical card. For example, an existing (e.g., initialized) verification count for the physical card may be incremented upon each receipt of a subsequent verification request implicating the card that is received via the API. In some embodiments, for a new physical card when verification is requested, a count is initialized and a value indicative of the initialization is returned (e.g., 0 Verifications, Verification #1, Verified New Card, Initialized, etc.) to indicate that the user is the first to verify the card and, as a result, the card cannot later be presented as new even if a tamper-evident mask over the passphrase is replaced. For example, if a count for a card is already initialized, a value returned (e.g., 1 Verifications, Verification #2, Previously Verified Card, etc.) for a subsequent verification request is indicative that one or more prior verification were performed for the card.

Some embodiments include a native application, which may executed on a mobile device of a user. The native application may interface with an image sensor of the mobile device to detect and scan an optical code. The scanned optical code may be a QR code corresponding to a physical card (e.g., the QR code may be disposed on a sticker adhered to the card) that encodes an address (e.g., an address for the transfer of ownership of a digital bearer asset recorded on a decentralized computing platform, like a blockchain based decentralized computing platform, and a digital bearer asset may be a token or cryptographic currency) based on a corresponding public key. In some embodiments, the corresponding public key resolves to various wallet addresses on various blockchain networks. The native application may be configured to query an API of a server of an issuer of the physical card with the QR code to request one or more additional wallet addresses. Each wallet address may have an associated balance as indicated by transactions record in a blockchain of a decentralized computing platform. In some embodiments, the native application displays a user interface indicative of wallet balances corresponding to one or more addresses associated with the currency card. The native application may be similarly configured to scan an optical code corresponding to private access information, like a QR code encoding a private key or ciphertext of the private key. In some embodiments, the nation application determines whether a scanned QR code corresponds to private access information and, when scanning of private access information is detected, the native application presents an interface by which a user may transfer funds from an address to which the private access information corresponds. In some embodiments, the interface provides a field to obtain from the user, or the device scans, a passphrase corresponding to encrypted private access information, such as when the QR code encodes a ciphertext representation of a private key (the access information). The passphrase may be a symmetric encryption key operable to decrypt the ciphertext to obtain the private key in plaintext, thereby enabling transfer of digital bearer assets from an account when the private key is operable to prove ownership of the account, such as by a digital signature and verification protocol of a decentralized computing platform.

Figure 1B:
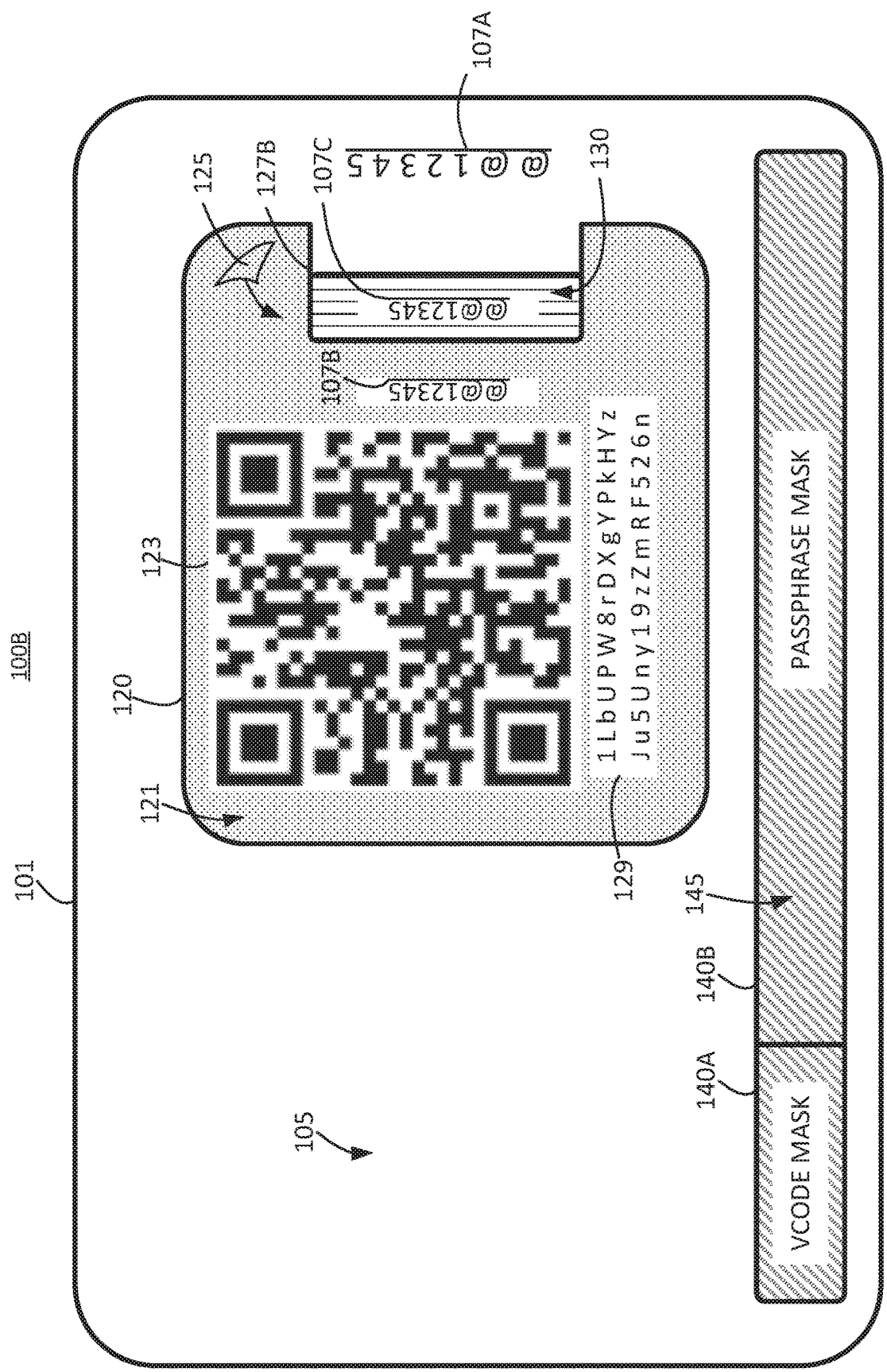

FIG. 1A and FIG. 1B illustrate examples of currency cards including example tamper-evident features and example authenticity verification features, according to some embodiments. Example currency cards described with reference to FIGS. 1A and 1B may be physical currency cards and include various ones of the technologies described herein. For example, the example currency card may include one or more tamper-evident features by which a user of the card can verify, upon inspection of the card, that private access information of the card has not been divulged to another party.

FIG. 1A illustrates an example 100A of a physical currency card configured to manage account access information for digital bearer assets, according to various embodiments. A physical card, like the illustrated example card 101, may have dimensions conforming or similar to the ISO/IEC 7810 ID-1 standard. Accordingly, some embodiments contemplate a physical card approximately 86 mm (~3 and ⅜ inches)×54 mm (~2 and ⅛ inches), such as 85.60 mm×53.98 mm, and which may have rounded corners with a radius of approximately 2.88-3.48 mm, and which may have a thickness of approximately 0.70-86 mm, like 0.76 mm.

The card 101 may comprise a card blank 105 having dimensions like those mentioned above and which may be wholly or partially constructed out of a material such as metal or plastic. For example, the card may be wholly metal, wholly plastic, or a combination thereof. In some embodiments, the card blank 105 comprises at least one layer of metal of at least $\frac{1}{3}^{rd}$ the thickness of the card, such as a 0.20-0.25 mm metal layer, which may be a font of the card. In other embodiments, the card blank 105 may be entirely of metal construction. In some embodiments, the card blank 105 has a construction permitting laser engraving of a font face of the card blank. For example, as shown, a unique identifier 107A may be laser engraved into a face, like a front face, of the card blank 105. Other information may also be laser engraved into a face of the card blank 105, such as a passphrase, like an encryption key (not shown), by which one or more ciphertexts corresponding to the card were generated and which may be concealed by a mask 140 subsequent to engraving.

Examples of metals used for the card blank 105 can include one or more of Titanium, having a density of 4.506 g/cm3 or Aluminum, having a density of 2.7 g/cm3. Other example metals may be an alloy, such as an aluminum alloy, like 6061 Aluminum having a density of approximately 2.7 g/cm3 or 7075 Aluminum having a density of approximately 2.81 g/cm3. Steel (e.g., stainless 304, 409, 630 etc.) and titanium (e.g., Ti6AI4V, TI 6-4, etc.) as well as other metal alloys are also applicable.

In some embodiments, the metal or alloy used for the card blank 105 is selected based on one or more properties of a sticker 120, or properties of the sticker are selected based on the metal or alloy used for the card blank. For example, in some embodiments, the selection of metals is the same, or different, such as to obfuscate private access information disposed on the sticker against scanning or other imaging attacks. For example, a layer of the sticker (above the private access information) may include reflective metal imbedded therein, and that metal may be selected based on the material of the card or vice versa. Similarly, a layer of the sticker (below the private access information) may include reflective metal imbedded therein of a different or same type as the top layer. The one or more layers of the sticker including metal imbedded therein in conjunction with the metal selected for the card blank 105 may substantially obfuscate private access information when the card 101 when subjected to non-destructive attacks (e.g., scanning). In other words, the configuration of the card blank 105 and sticker (discussed in more detail below) may be such that a user (nefarious or otherwise) must activate one or more tamper-evident features of the card to obtain private access information, which thereby indicates to other users that the private access information is no longer private.

In some embodiments, different layers of a sticker 120 may have different sizes, for example, a first layer or first set of layers may have first dimensions (e.g., size) of length, width, radius, etc. that, when applied, correspond to a first area having similar dimensions or size (e.g., when applied to a face of a physical currency card). In some embodiments, a second layer or second set of layers may have second dements (e.g., size) of length, width, radius, etc., that, when applied, correspond to a second area having similar dimension or size (e.g., when applied to the face of the physical currency card). The dimensions of the second layer or second set of layers may be configured such that they extend beyond the dimensions of the first set of layers, such as beyond at least a portion of the perimeter of the first set of layers, like 60-90%, or even 100%, to encapsulate (e.g., envelope, cover, hide, enclose, or otherwise conceal) an area (e.g., having dimensions corresponding to the private access information) of the first set of layers. In some embodiments, a window portion is formed in the second layer or second set of layers, through which information may be visible via the window (e.g., whether through a window cutout, cutout window notch, or transparent window or transparent window notch). In some embodiments, the information corresponds to the public access information disposed on a portion of the first layer (e.g., within an area having dimensions corresponding to the public access information) of the first set of layers. However, in some embodiments, the first layer or first set of layers may include a tab-like extension including the public access information that is configured to extend beyond the perimeter of the second layer or second set of layers without any physical windowing of the second layer or second set of layers. Different layers may be comprised of different materials, like different films or disposed materials whether coating or adhesive, and the thickness (or depth normal to a surface) of different layers may vary based on the thickness of the film or disposed coating or adhesive.

In some embodiments, a swatch having dimensions approximate to the dimensions of a sticker 120 may be laser engraved into a front face of the card 101. For example, the swatch may be laser engraved in a metal face of the card, or a plastic face of the card, or otherwise applied to the face of the card (e.g., by other means to apply the swatch, by material selection, or otherwise) in a location where the sticker 120 is to be applied. The swatch area may have a root-mean-squared surface roughness greater than non-swatch areas to promote adhesion of an adhesive, like an adhesive layer or disposed adhesive glue. For example, a surface roughness as measured by a profilometer within a swatch area may be 50% higher than other parts having a smoother finish. The above configuration of the swatch should not be construed as being limited to a specific area or dimension (e.g., size) as a front face of the card 101 may substantially correspond to the dimensions of a swatch (e.g., the front face may be wholly or substantially configured like a swatch). For example, the card blank 105 may be manufactured with a rough-cut finish, anodized or otherwise chemically etched to include a rough (like a matte finish)

rather than a polished finish. In other words, there is no requirement for a swatch-like surface to be localized to where the sticker is applied. The swatch may be a pattern (or surface type, like a matte finish whether laser engraved, chemically etched, coated, or otherwise so manufactured to include a surface type or pattern other than polished surface) of a shallow depth to promote adhesion by an adhesive (e.g., an adhesive layer backing a sticker 120) relative to a smooth surface. For example, a sticker 120 having an adhesive layer backing the sticker may be applied to the card blank 105, and the adhesive of the sticker may substantially contact the swatch. In some embodiments, the depth of the pattern of the swatch relative to the face is less than 0.05 mm, and may be approximately 0.005-.010 mm in depth.

As described above, information may be engraved on a surface of the of the card blank 105. Examples of information may include a unique identifier 107A, an encryption key (e.g., covered by mask 140), and other information as described herein. For example, a unique identifier 107A may be engraved or stamped to a depth less than 0.20 mm, like 0.02-.15 mm, or approximately 0.07-.08 mm in some embodiments. In some embodiments, the depth of the engraving of the encryption key may be shallower than the unique identifier, but may be of a larger font, the depth selected to afford readability but mitigate applicability of some scanning or other tampering (e.g., like pressing of the mask 140 into the etching to ascertain the key). In some embodiments, the depth of the encryption key etching is approximately 0.02-.04 mm, although other embodiments may utilize a same depth as the unique identifier 107A. In turn, the mask 140 may encapsulate (e.g., envelope, cover, hide, enclose, or otherwise conceal) the encryption key disposed on the surface of the card.

In some embodiments, the physical card 101 includes, adhered to the card blank 105 which may be engraved (e.g., to include a unique identifier 107A and other information described herein), a tamper-evident sticker 120 with at least two physical component layers, and each component layer may include one or more layers. For example, a tamper-evident sticker 120 may include two component layers, or components, and each component may have one or more layers. In some embodiments, at least one component, like a bottom-component, is partially concealed by a top-component. For example, a bottom-component may include private access information printed thereon that is concealed by the top-component. At least the top-component may include one or more tamper-evident features such that by visual inspection a user can easily determine whether private access information has been accessed (e.g., divulged) or is secure (e.g., has not been divulged). For example, a tamper evident pattern may appear within at least a portion of a component when that component is lifted away (e.g., such as to view concealed information) from a surface it adheres to with a threshold strength, like a swatch area of a card blank 105.

As shown, a sticker 120 is applied to a face (e.g., a front face) of the card blank 105. As described above, in some embodiments, the sticker 120 may be applied in the location of a swatch on the front face of the card blank 105. The swatch may promote adhesion of an adhesive of the sticker 120 with the material of the front face of the card 101 (e.g., a metal, plastic, composite, etc. as described above). Embodiments of the sticker 120 may comprise one or more tamper-evident features, at least one of which may be activated when a portion of the sticker 120 adhering to the front face of the card 101 is lifted from the front face of the card. For example, the sticker 120 may include a component 121 within which a tamper-evident pattern appears when the component 121 is lifted 125 from a surface (e.g., the front face of the card) to which it adheres, and the configuration of the swatch may promote appearance of the tamper-evident pattern via the adhesive strongly adhering to the swatch. In some embodiments, the tamper-evident pattern is configured such that the appearance of the sticker 120 cannot be returned to an original appear subsequent a lifting 125 of the component 121 from the card blank 105. In some embodiments, the component 121 may be configured such that at least one layer (e.g., an upper layer) remains relatively intact with a tamper-evident pattern being revealed therein by virtue of underlaying destruction promoted by the adhesive in a lower layer of the component when lifted 125 from the card blank 105. In some embodiments, the component 121 may be configured such that a plurality of layers through a cross section of the component are destroy in at least some portion of the component when lifted 125 from the card blank 105. In some embodiments, the above aspects are combined, for example, a first portion of the component 121 may easily tear when lifted 125 and another portion may not easily tear but the tamper-evident pattern is revealed when lifted 125.

In some embodiments, as described above, the component 121 is configured to reveal a tamper-evident pattern when a corresponding portion of the component is lifted 125 from a surface to which it adheres to with sufficient strength. For example, in some embodiments, the surface (e.g., the swatch, material of the card blank 105, or combination thereof) to which at least some portions component 121 adhere to causes the revealing of the tamper-evident pattern by promoting adhesion of sufficient strength to reveal the pattern. Note that this does not necessarily mean that the component 121 is difficult to lift from the card blank 105, but rather that the component is difficult to remove without evidence of tampering. For example, an adhesive utilized in the component 121 may be colored (e.g., silver) and pull away from the component lifted, thereby revealing the pattern. Several non-limiting examples of a component 121 of a sticker 120 may include one or more features outlined below:

An example component may include one or more layers, such as one, two, three, four, or more layers. At least one layer of a component, such as a bottom layer, may include an adhesive operable to adhere to at least one surface, like a surface of a card blank. In some embodiments, the adhesive may be an adhesive layer applied to a sticker-roll in a manufacturing process and subsequent layers are added thereto to construct a multi-layer component. In some embodiments, the adhesive may be applied to a layer, which is then applied to a sticker-roll, and other layers are added thereto to construct a multi-layer component. In either instance, at least one layer, like a bottom layer of a component, may include an adhesive, such that the component may be attached to a surface. In some embodiments, the adhesive may be applied to a surface to which the component is attached, such as a surface of a face of a physical currency card, and one or more layers or components are adhered thereto by the adhesive disposed on the surface. Examples of adhesives may include glues, like an oil-based glue, or other suitable glues, examples of which may include an organic (e.g., oil), water, or other solvent base, which is mixed with a corresponding adhesive to create an adhesive solution for application. For example, a polymer (whether synthetic or natural) or resin adhesive may be dissolved in a corresponding solvent base for a given application. In some embodiments, an adhesive layer comprises a tamper-evident structure, which may be formed in the adhesive layer, or created in the layer by an overlaying film. In some embodiments, the adhesive layer is a film of adhesive, which may have selectively applied a pattern to cause different binding strength to a surface or film layer of a component in contact with the adhesive.

In some embodiments, a layer is polymer film, such as a polypropylene (PP) or polyester (PET) film, like an oriented film, which may be biaxially oriented. Orientation of a film may thin a starting film proportionally to the orientation, which may also be referred to as a stretch ratio. For example, to get to a 1 mil (where 1 mil=$\frac{1}{1000}$ of an inch, or 0.0254 mm) finished film with 5:1 stretch ratio in a first direction (e.g., lengthwise), a 5 mil film of polymer may be stretched proportionally (e.g., to approximately 5 times the starting length) in the first direction. For a biaxially oriented film, to get to a 1-mil finished film with 5:1 stretch ratio, a 25 mil film may be stretched proportionally in a first direction and a second direction (e.g., both lengthwise and widthwise by approximately 5 times the starting length and width). Thus, for example, in some cases a layer may be a biaxially oriented polypropylene (BOPP) or biaxially oriented polyester (BOPET) film, which may have a width of more than 100 inches, or more than 300 inches, and be many times longer in length, such as at least the length of a roll on which the stickers are manufactured. In some cases, one layer may be a PET or BOPET layer, and another layer may be a PP or BOPP layer. Accordingly, when a layer is described as a PET layer, such as a layer formed by a PET film, it should be understood that the layer may be formed from a PET film (e.g., which may be unstretched or is stretched in one dimension relative to a base PET film) or BOPET film (e.g., which is stretched in two dimensions relative to a base PET film) unless otherwise stated; and when a layer is described as a PP layer, such as a layer formed from a PP film (e.g., which may be unstretched or is stretched in one dimension relative to a base PP film) or BOPP film (e.g., which is stretched in two dimensions relative to a base PP film) unless otherwise stated. Further, in some embodiments, a PP film or PET film may be substituted with a polyethylene (PE) or other applicable film.

In some embodiments, a film is metallized. In some embodiments, multiple layers of film are utilized, some of which may be different films (e.g., a PP film for one layer and a PET film for another layer) to obtain different features or properties in a component. For example, a PP or PET film may be vacuum-metallized (e.g., like vapor deposition) or imbedded with metal flakes. In some embodiments, a vacuum-metallization process may be utilized to increase resistance to moisture intrusion. In some embodiments, a fragrance or other compound may be disposed (e.g., by a vacuum process) in a film, such as within a PP film, whereby scratching that film when it is utilized as a top layer releases (or exposes) at least some of fragrance or compound to increase perception of the scent. In some embodiments, thickness of a film ranges from 0.3-1.5 mils, but other thicknesses may be utilized. In some embodiments, for a same thickness, a PET film is less flexible than a PP film, and as a result, a PET film may afford greater stability than a PP film in printing. Accordingly, in some embodiments, at least one PET film is utilized for a component in at least one layer prior to a printing of information (e.g., an optical code, text, graphics, etc. as described herein), like in a lower layer of a component, on which the information is printed and another layer of film (e.g., PP or PET) is subsequently applied after the printing of the information. Thus, for example, an adhesive layer (which may have an adhesive structure, such as to reveal a pattern) may be formed, or applied to a lower PET layer, on which information is printed, and a subsequent upper layer may be applied to protect the lower PET layer (e.g., to protect the information printed on the lower layer). For example, in some embodiments, an upper layer of a component may be a PET layer, or in some embodiments, an upper layer of a component may be a PP layer.

In some embodiments where a sticker 120 is a multi-component sticker, a bottom-component comprising private access information may include a lower PET layer (e.g., for printing and durability) and an upper PET layer (e.g., for durability), and a top-component comprising public access information may include a lower PET layer (e.g., for printing and durability) and an upper PP layer (e.g., for impregnation of a fragrance or metal for enhanced moisture resistance or resistance to scanning). Thus, as outlined herein, various combinations of films and technologies may be utilized in different layers to obtain different component configurations for the different components of a multi-component sticker. For example, moisture, oxygen, ultraviolet, heat, and other environmental resistance properties of films may be considered to afford a desired configuration of layers in a component. Further, for example, strength and durability of a film or layer of material, whether by virtue of the material or construction of the film or layer (e.g., PP, or PET, or PE, or other compound and whether stretched in a single direction or biaxially stretched), may be considered to afford a desired configuration, such as whether a given layer should peel away cleanly, break apart, or otherwise interact in combination with an adhesive to afford tamper-evidence. Example beneficial properties of a PET film, such as a BOPET film, may include dimensional stability, thickness uniformity, and transparency; and example beneficial properties of a PP film, such as a BOPP film may include transparency and moisture barrier.

Example films and technologies consistent with the disclosure of components and layers thereof for utilization in a multi-component sticker may include, in addition to the examples described above, one or more upper-layer films or substrates (e.g., PET type films and substrates like a chrome polyester or polyethylene terephthalate polyester, PP type films and substrates, vinyl films and substrates, ceramic films and substrates, or other films or substrates, which may be optionally embedded with chrome or a metal (e.g., metallized) to mitigate certain scanning or imaging techniques for determining information of the concealed portion or embedded with a fragrance by which users may ascertain authenticity) and an underlying-layer film or substrate (e.g., one of the above mentioned films or substrates or an adhesive film or substrate) having an adhesive pattern portion (which may be an adhesive layer to which the underlying-layer is applied, or an adhesive applied to the underlying-layer, or inherent to the underlaying-layer or promoted in the underlaying layer or in the adhesive layer whether by laser, cutting, or other applicable process), like a diamond, hexagonal, or square checkerboard-like pattern. In various embodiments, the adhesive pattern portion of an underlaying-layer is such that when a substrate top-coated portion of the substrate is peeled away, the pattern portion underneath remains. In turn, the sticker 120 cannot be resealed or reused to original appearance, thus being evident of tampering should a user attempt to ascertain the information on the concealed layer of the sticker 120.

In some embodiments, a component includes a destructive layer of a PP, PET, or vinyl film or substrate that rips and tears apart easily (e.g., inherent to the substrate or by manufacturing process, such as via perforations or cuts in the substrate to promote tearing), and once adhesively applied to a surface is destructible in the sense that it cannot be removed in one piece. For example, a strong adhesive utilized in conjunction with the destructive layer may cause the substrate to easily-fragment material and means that it is difficult to remove the layer (e.g., from the swatch portion without leaving pieces behind, however it may remove easily without tearing from some other surface, like that of a bottom component). In turn, such a top-component of a sticker 120 cannot be resealed or reused to original appearance, thus being evident of tampering should a user attempt to ascertain the information on a concealed, bottom-component of the sticker 120 or otherwise concealed by the top-component. In some embodiments, an adhesive layer comprises similar properties, such as a pattern promoted in the layer, and some of the pattern peels up with an underlaying layer and some remains adhered to the surface to which the component was applied. In some embodiments, a component includes a layer of a PP, PET, or vinyl film or substrate that contains a concentration of light-refracting elements to increase difficulty to forge, scan, or reproduce the component. In some embodiments, a component includes a foil film or substrate (which may be a metallized film or a foil), like a holographic foil or film, having a prismatic effect and pattern that deters forgery or duplication.

In some embodiments, a component includes one or more relatively transparent portions of one or more layers such that an adhesive or adhesive residue, which may be colored, and configured to reveal a pattern when the component is lifted from the surface the adhesive adheres the component to reveals a pattern. A transparent or relatively transparent portion enables a user to discern at least some information through (e.g., information that underlays) the material, such as by visual identification, like a pattern being visible at 1-3 feet or underlying text of 8-12 pt font being readable at 1-2 ft. For example, a residue of an adhesive layer or adhesive utilized for a layer may cause, within the transparent portions of one or more other layers of a component, a highly visible pattern of shapes (e.g., in a checkerboard-like pattern) to be left behind when the component is lifted from a surface to which it adheres (e.g., with sufficient strength, like to a material of the card, but may adhere to some other surface, like that of a bottom component, within which that portion a pattern may not be revealed—which in some instances may readily convey that a top component was lifted due to some portions including a pattern but not others). Such an adhesive may be colored, such that the shapes are visible. As described above, some relatively transparent portions (e.g., with none to minimal printing within those areas) are utilized in conjunction with such an adhesive such that shapes (or pattern, or in other embodiments, tears in one or more layers, like underlaying layers) are at least partially visible on the component when it is lifted away from a surface. In some embodiments, the portions not corresponding to the shapes (or pattern, or in other embodiments, tears in one or more layers) lifted away with the component remain on the surface to which the component was adhered to such that removal of the component is tamper evident on both the component and the surface to which it was applied. In some embodiments, the adhesive or a layer of the component stretches (e.g., in the pattern or shapes), tears, or otherwise is at least partially altered (e.g., destroyed) visibly in the component or on a surface to which the component adheres when the component is lifted from surface such that an attempt of a matching of tamper-evident features visible in the component (or portion thereof) that was lifted from the surface back to the corresponding tamper-evident features visible on the surface (e.g., in an attempt to reposition and re-lay or adhere the component (or portion thereof) back to the surface) does not return the component to an original state upon visible inspection. For example, there may be gaps or other visible tamper-evident features (compared to a uniform appearance in an unaltered state) that betray an attempt to replace the component subsequent to tampering. Accordingly, in some embodiments, a component of a sticker 120 cannot be resealed or reused to original appearance, thus being evident of tampering should a user attempt to ascertain information, like private access information, concealed by that component.

Further, in some embodiments, a component of a sticker 120 may include, in addition to at least one tamper-evident feature, a EURion constellation, or other pattern configured to cause imaging software to detect the presence of a component of the sticker 120 in a digital image. In some embodiments, where the sticker is a multi-component sticker 120, one or more components (with or without a tamper-evident feature) may include a EURion constellation, or other pattern configured to cause imaging software to detect the presence of a component of the sticker. Such software may block a user from reproducing the sticker 120 or a component thereof. For example, the EURion constellation or other pattern may be printed on the component 121 along with other information when generating the sticker 120. Similarly, the EURion constellation or other pattern may be printed on another component, like an undelaying bottom-component 130 (which may also be a second, underlying sticker), of a multi-component sticker 120 in addition to a top-component 121.

One or more of the above-mentioned configurations may be used alone or in combination to construct a sticker 120. In some embodiments, as mentioned above, the sticker 120 may be a multi-component sticker and one or more of the above-mentioned configurations may be used alone or in combination to construct a given component of a multi-component sticker. The different components may be constructed separately (e.g., as individual stickers) and merged together prior to application or applied in sequence to form a multi-component sticker 120. Alternatively, in some embodiments, a multi-component 120 sticker may be formed by constructing a first underlaying bottom-component and constructing a second overlaying top-component thereupon. Regardless of the specific construction method, embodiments may utilize a different configuration for different ones of the components to construct a multi-component sticker. Thus, generally, as referred to herein, a given component may have a relatively discrete function (e.g., include some component specific information and one or more features selected from tamper-evident features, features to mitigate scanning attacks, or features to prevent reproduction depending on function) compared to another component.

In some embodiments, at least some information disposed on a card blank, such as information corresponding to private access information, may be masked 140. The mask 140, like a component 121 of sicker 120, may include one or more tamper-evident features. For example, a mask 140 may have one or more layers having a similar configuration to a component 121. In some embodiments, the mask 140 is a sticker having dimensions (like a length and width) operable to encapsulate (e.g., envelope, cover, hide, enclose, or otherwise conceal) an area of the card blank 105 on which the information corresponding to private access information is disposed, like an area within which an encryption key or passphrase operable to access private access information is engraved or otherwise disposed on the card blank. For example, embodiments of a mask 140 may include a layer having a similar construction by which a tamper-evident pattern appears within a component 145 of the mask to provide a tamper-evident masking that conceals an encryption key engraved on the card blank 105. In some embodiments the mask 140 may include both tamper-evident features, such as by a multi-component mask having a top-component which when lifted a pattern is revealed and includes a window to a bottom-component having a scratch-off surface by which the concealed encryption key may be revealed, and the top-component may surround the bottom-component with some overlap (e.g., a first portion of the top-component, such as around the window, overlaps with the bottom-component and a second portion adheres to the card blank 105). In some embodiments, the mask 140 includes a component 145 having a scratch-off surface layer by which a concealed encryption key may be revealed. For example, the component 145 may include multiple layers, like an adhesive layer, an underlaying layer and a scratch-off layer or scratch-off material disposed on the underlying layer. In some cases, the adhesive and underlaying layer may be transparent such that removal of the scratch-off material reveals the information concealed under the mask 140. In some embodiments, the component 145 of the mask comprises a destructive tamper-evident feature in addition to a scratch-off top layer to prevent bypassing of revealing the concealed information by scratching off the material. For example, one or more layers of the component 145 of the mask 140 may be perforated or cut to promote tearing when lifted.

As described above, in some embodiments, the tamper-evident sticker 120 includes at least two physical components, one of which is partially concealed by the other. A top, exposed component 121 may include an optical code (e.g., a QR code) portion 123. In some embodiments, the optical code portion 123 include an optical code printed within the portion that encodes an address corresponding to a public key of a public-private key pair of an asymmetric encryption algorithm. In some embodiments, an optical code printed within the portion may encode the public key (e.g., instead of or in addition to a corresponding address). In either instance, printing within the optical code portion 123 may occur on a component 121 of the sticker 120, such as a top-component visible to a user. In some embodiments, the exposed top-component 121 of the sticker 120 may include an alpha-numeric portion 129. The alpha numeric portion 123 may include information printed thereon that corresponds to the information encoded by an optical code within the optical code portion 123. For example, a QR code printed within the optical code portion 123 may be an encoded version of an alphanumeric string printed within the alphanumeric portion 129. In some embodiments, both may be an address corresponding to a public key of a public-private key pair. Alternatively, in some embodiments, the optical code portion 129 may be an encoded public key, and the alphanumeric portion 123 an address in plaintext, or the optical code portion 129 may be an encoded address, and the alphanumeric portion 123 a public key in plaintext.

The top, exposed component 121 may also include a unique identifier portion 107B. A unique identifier of the top-component of the sticker 120 may be printed within the unique identifier portion 107B. The top, exposed component may also include a window portion 127A through which a portion of a bottom-component 130 of a multi-component sticker 120 may be visible while other information corresponding to one or more other portions of the bottom-component of the sticker 120 remain concealed. The unique identifier may correspond to a serial number within a namespace of an issuer of physical currency cards such that the card issuer may ensure a match of components of multi-component stickers 120 having different information on different components and a match to card blanks 105 having different information etched on the them. For example, a unique identifier 107A may be etched on a card blank 105, printed 107B on the top-component 121, and printed 107C on the bottom component 130 within at portion visible from a window portion 127A of the top-component. Accordingly, for a finished card 101, a set of a top-component 121 may include visible public access information and the bottom-component 130 may include concealed private access information, the combination of which when matched by the unique identifier being operable to receive and access digital bearer assets of accounts based off the private access information of a bottom-component 130 (divulging of which is evident via removal of embodiments of a top-component 121 including one or more tamper-evident features). In some embodiments, as an additional layer of security, the set may include information on the card 101 in addition to the components, such as by a card blank 105 having etched thereon an encryption key or passphrase operable to obtain plaintext private access information from ciphertext private access information on the bottom-component 130 and which may be matched to the corresponding components by the unique identifier.

In some embodiments, the window portion 127A of the top, exposed layer is aligned with a unique identifier portion 130 of the lower layer of the sticker 120, such that the unique identifier is visible within the window. In assembly of the sticker 120, the top, exposed layer substrate 121 may be aligned with the lower layer and the information printed on the top, exposed layer matched to the information printed on the lower layer based on the unique identifier printed within the unique identifier portion 130 of the lower layer. Thus, for example, the unique identifier printed on the lower layer may correspond to the unique identifier printed on the top, exposed layer of the sticker 120, the correspondence being visually verifiable by a user through a matching of the printed unique IDs by virtue of the window 127A. In turn, the sticker 120 may be applied to a card blank 105, which may be etched with the unique identifier, thus indicating that the information etched on the card blank 105 corresponds to the information printed on both layers of the sticker 120.

As described above, a QR code printed within the optical code portion 123 may be an encoded version of an alphanumeric string printed within the alphanumeric portion 129, for example, both may be an address corresponding to a public key or in some cases, the public key. In some embodiments, the public key of a public-private key pair may be utilized to generate an address. In some embodiments, the card issuer may generate, with a server, a plurality of addresses for different decentralized computing platforms based off the public key, like a set of addresses corresponding to a set of decentralized computing platforms for which corresponding addresses are operable to receive digital bearer assets associated with the respective decentralized computing platform. In some embodiments, one address may be printed on a sticker 120, such as within the optical code portion 123 of a component 121 of the sticker, and a server (e.g., of the card issuer) may be queried with information based on an optical reading of the QR code such that the other addresses based of the public key or the public key can be retrieved (e.g., without accessing private access information concealed by the component 121). In some embodiments, one or more addresses are printed on the component 121. In some embodiments, the public key is printed on the component 121. In some embodiments, the public key is printed on the component 121 in conjunction with an address. In some embodiments, the public key is etched on the card, such as under a mask, like a mask 140, such that a user may retrieve the public key if necessary if the component 121 is discarded. Further, in some embodiments, private access information like an encoded private key or the private key may be encapsulated (e.g., enveloped, covered, hidden, enclosed, or otherwise concealed) by the component 121. For example, in various embodiments, the private access information may be included on a portion of a bottom-component 130 of a multi-component sticker 120 that is concealed by an upper, top-component 121 of the sticker which includes the public access information. However, in some embodiments, the private access information (e.g., the private access information included on a bottom-component 130 that is concealed by the top-component 121) may be alternatively engraved on a portion of the card blank 105 and concealed by one or more components of a sticker 120 (e.g., at least a component 121 having tamper-evident features). In some embodiments, the card blank 105 is engraved with private access information in duplicate (e.g., either by optical code or by alphanumeric text) to a bottom-component 130, which, in some embodiments, may provide means of obtaining private access information in instances where a bottom-component of a sticker is destroyed (e.g., by abrasion, moisture, fire, or other environmental exposure). The one or more features of components of a sticker to prevent scans or otherwise non-invasive methods of ascertaining private access information printed on a component of a sticker 120 (e.g., on the bottom-component 130) may also mitigate attempts to ascertain an engraving or etching in the card blank 105 having a depth below a threshold. Alternatively, in some embodiments, the engraving or etching may be filled with a material of similar density, reflectivity, or both such that a scan or other non-invasive method cannot ascertain the information disposed on the card blank 105 (similar precautions may also be implemented for other information disposed on the card blank, like information engraved or etched under mask 140).

As described above, an address, e.g., within portion 123 or portion 129 of a card 101, may be utilized within a decentralized computing platform for receiving transfer of a digital bearer asset of the decentralized computing platform, such as a transfer resulting from a user of the decentralized computing platform submitting a transaction on the corresponding platform. An example transaction, such as from the user by an address generated based on a public key for which that user also holds the corresponding private key may transfer the asset (or assets), like funds, to the specified address (e.g., the address corresponding to the card 101). In some embodiments, an address is generated for a given decentralized computing platform based on the public key of a public-private key pair according to an address protocol (or format) specified by the given decentralized computing platform. For example: given a private (secret) key and corresponding public key of a key-pair, an address for a given platform (e.g., bitcoin blockchain in the example below) may be generated, such as by taking the corresponding public key (e.g., 33 bytes, 1 byte 0x02 (y-coordinate is even), and 32 bytes corresponding to x-coordinate is generated with the secret key, hashing on the public key (e.g., SHA256 cryptographic hashing function), hashing on the result of SHA-256 (e.g., truncating by RIPEMD-160 cryptographic hashing function), adding a version byte in front of RIPEMD-160 hash (e.g., 0x00 for Bitcoin on bitcoin blockchain, or other version byte as some blockchains may support different versions or variations of addresses for different digital bearer assets), hashing the result of the now extended truncated hash (e.g., SHA-256 hash), hashing the result (e.g., subsequent SHA-256 hash), taking the first X (e.g., 4) byte checksum of the result of the second hashing, and adding the 4 checksum bytes at the end of extended RIPEMD-160 hash from earlier to generate an address (e.g., a 25-byte binary Bitcoin address). In some embodiments, the 25-byte binary address may be converted into a byte string, such as a base58 byte string, by Base58Check encoding, to generate an alphanumeric bitcoin address. Here, the resulting address may be verified deterministically based on the public key, a specific example for a version 1 BitCoin address is outlined in "Technical background of version 1 Bitcoin addresses," obtained on the filing date of this application and incorporated by reference herein from https://en.bitcoin.it/wiki/Technical_background_of_version_1_Bitcoin_addresses, a copy of which is included in the information disclosure statement filed with the application.

Other platforms may utilize similar steps but in a different sequence, different version bytes, or other variation such as in hashing order, truncation, and the like, but may be similarly deterministic based on the public key of the key pair for the given platform. For example, some decentralized computing platforms may have different address protocols having different checksums, different truncations (e.g., first values or last values), different prefixes, different one-way hashing functions, and the like. In some embodiments, generate a set of addresses by a server or computing system of the issuer includes forming one or more address based on a public key by deterministically generating one or more of a first address among the set of addresses based on a Keccak-256 hash that is based on the public cryptographic key; a second address among the set of addresses based on a RIPEMD-160 hash of a SHA-256 hash that is based on the public cryptographic key, the second address also being based on a checksum based on the RIPEMD-160 hash, and the second address having a Base58 encoding based on a first dictionary; and a third address among the set of addresses with a Base58 encoding and a checksum that are both based on the public cryptographic key, the Base58 encoding of the third address being based on a second dictionary that is different from the first dictionary.

A server of the card issuer may store a set of one or more of the addresses based on a given public key corresponding to an issued card for the different platforms such that a user in possession of the issued card may query the service to retrieve addresses for a plurality of platforms to transfer assets to respective addresses based on the public key (and later access those digital bearer assets, such as to original a transfer of held digital bearer assets, by accessing the private access information of the card to obtain the corresponding private key).

In some embodiments, when the user wishes to access those digital assets, the user may access private access information concealed by a component 121 by lifting 125 and peeling off the component 121. Peeling off the component 121 reveals the information concealed thereunder, such as the private access information that corresponds to the public access information printed on the component 121 (e.g., within the optical code portion 123 or alphanumeric portion 129 or from another address in a set of addresses generated based on the public key). For example, the private access information may be printed on a bottom-component 130 and visible once a top-component 121 is removed. In some embodiments, a user may also peel, scratch, or otherwise interact with a mask 140 to reveal an encryption key by which ciphertext private access information may be decrypted to obtain plaintext private access information such as the private key. User experience is drastically simplified over previous implements, a component 121 of a sticker is physically peeled back (or off) to reveal a secret. And, by virtue of disclosed embodiments of a tamper-evident features of the component 121, loss of secrecy is physically apparent by visual inspection with the naked eye. Moreover, there is no need for a user to remember a set of key recovery passphrases, like those often used with electronic approaches.

FIG. 1B illustrates an example 100B of a physical currency card configured to manage account access information for digital bearer assets, according to various embodiments. Embodiments of the example 100B of a physical currency card may include a different window 127B and mask 140 configuration over that of the examples in FIG. 1A. The various examples may be combined, such as a mask as described with reference to FIG. 1B with a window as described with FIG. 1A and vice versa.

As shown in FIG. 1B, the example window 127B is a cutout portion of component 121 that extends to the edge of the component 121 of sticker 120. In other words, in contrast to the example window 127A illustrated in FIG. 1A, the example window 127B of FIG. 1B is not fully surrounded by the component 121. Thus, a bottom-component 130 may have an edge or perimeter portion that is not overlapped by the top-component 121, while the top-component 121 extends over another edge(s) or perimeter portion. Other example window configurations may also be used, or in some cases, a bottom-component 130 may extend beyond the border of a top-component 121, like a tab, which may correspond to a unique identifier portion 107C on which a unique identifier is printed and visible upon inspection of the card 101.

Also shown in FIG. 1B, an example mask 140 includes a first portion 140A and a second portion 140B. In some embodiments, the first portion 140A corresponds to a verification code (e.g., a first portion of the underlying encryption key or passphrase) by which the card 101 may be verified without revealing a second portion 140B (e.g., a remainder of the underlying encryption key or passphrase). In some embodiments, the component 145 of the mask 140 is marked to indicate the different portions. For example, the component 145 may be visibly perforated and optionally include printed information indicating that a first portion 140A may be removed to reveal a verification code portion of an encryption key without removing a second portion 140B thereby divulging the remaining second portion of the encryption key. In another example, a scratch-off surface of the component may be printed to the indicate the different portions and include printed information indicating that material corresponding to the first portion 140A may be scratched off to reveal a verification code, but that the second portion 140B need not be scratched off until the user desires to obtained private access information.

Figure 2:
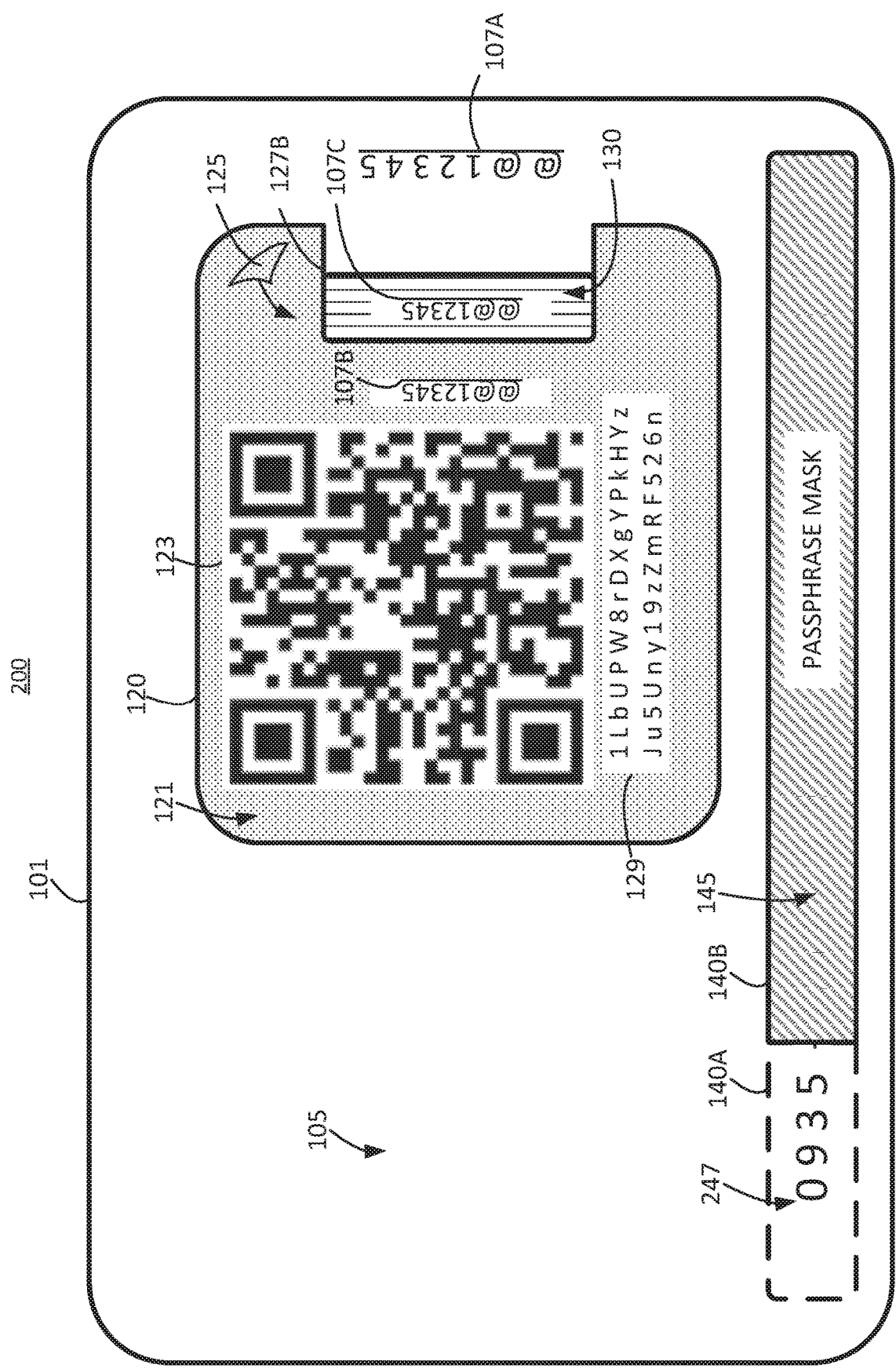
FIG. 2 illustrates an example of a currency card including a verification code component of a cryptographic passphrase and corresponding tamper-evident mask, according to some embodiments.

FIG. 2 illustrates an example 200 of a currency card including a verification code component of a cryptographic passphrase and corresponding tamper-evident mask, according to some embodiments. Compared to the examples of FIG. 1B (or FIG. 1A), FIG. 2 illustrates the removal of a portion of a mask 140.

A component 145 of the mask 140 may be tamper evident, such that removal of a portion 140A of the mask (whether by lifting or scratching a surface of the component) is evident upon visual inspection. As shown, a first portion 140A of the mask has been removed to reveal concealed information while a second portion 140B of the mask remains intact. As described above, the first portion 140A of the mask may have been removed by a variety of methods, such as by scratching a surface of the component 145 corresponding to the first portion 140A to reveal information thereunder, by lifting the component 145 (or one or more layers thereof) from a surface of the card blank 105 corresponding to the first portion 140A to reveal information thereunder (in which case a pattern or residue or tear in that portion of the component may be evident), or by other means that activates a tamper-evident feature of the component 145 corresponding to the first portion 140A when a portion of underlying information 247 is revealed. The portion of underlying information 247 concealed by the first portion 140A of the mask may be a verification code operable to verify authenticity of the currency card 101. For example, the verification code may be a corresponding first portion of an encryption key or passphrase, by which private access information in ciphertext concealed by a component 121 of the sticker 120 can be decrypted to obtain private access information in plaintext. Alternatively, a verification code may be separate from the encryption key or passphrase (e.g., the first portion 140A conceals a verification code which does not correspond to first portion of the encryption key or passphrase), like a cryptographic hash (e.g., truncated to a desired number of characters) based on information corresponding to the card (e.g., the unique identifier, optical code or other visible information) or a PIN by which the card 101 may be verified.

In some embodiments, an issuer of physical currency cards maintains a database associating unique identifiers of components (e.g., 121, 130) of a sticker 120 and engraved card blanks with verification codes. In some embodiments, the entry may be a hash, like a cryptographic hash, such as a SHA-256 hash of a unique identifier concatenated with the verification code, or other information by which correspondence between a unique identifier and verification code may be maintained. In some embodiments, an issuer of physical currency cards may publish an algorithm by which issued physical currency cards may be verified with verification codes. In turn, for example, a user may utilize an application to verify the physical currency card by imputing the verification code and other information, such as the unique identifier of the card and the public access information (e.g., the public key or address encoded by the optical code printed within the optical code portion 123 or the alphanumeric text printed within the alphanumeric text portion 129 of the component 121 of the sticker comprising public access information). In some embodiments, the application may submit a request to a server to verify the card, such as server of the card issuer, or a decentralized computing platform, such as by requesting execution of specified smart contract on the decentralized computing platform. An example smart contract may be a portion of executable code, like a script. A computing node of the decentralized computing platform on which the script resides (e.g., immutably within a block of a blockchain or blockchain-like immutable data store) may access the script at a specified address, like a cryptographic hash address, and execute the script in response to request (e.g., a request specifying the address and including input information, like a verification code and unique identifier) and return the results. In some embodiments, a node is a peer node of the decentralized computing platform and stores in memory at least part of a distributed ledger recording transactions in which digital bearer assets, like cryptographic tokens, have been transferred into an account on the decentralized computing platform corresponding to the public key of the public-private cryptographic key pair, wherein the decentralized computing platform is operative to transfer the cryptographic tokens out of the account responsive to a party demonstrating possession of the private cryptographic key. The distributed ledger may also store other information by way of a function or transaction (e.g., sstore, sload, etc.), such as information operable to verify a card based on key-value pairs. In some embodiments, the results are returned by publication of the results to the immutable data store of the decentralized computing platform, like a transaction. In some cases, a user may pay a gas (e.g., processing fee) for the processing to verify the physical currency card, thus minimizing reliance on a card issuer for verification subsequent to purchase. In some embodiments, the card issuer may publish verification results or verification information to the immutable data store, such that users may verify by either method.

In some embodiments, the underlying information 247 concealed by the mask 140 is an encryption key, like a symmetric encryption key, which may be operable to decrypt at least some information of the sticker 120. For example, a bottom-component 130 of the sticker 120 or engraving in the card blank that is concealed by at least component 121 of the sticker may include ciphertext corresponding to a private key which the encryption key is operable to decrypt to obtain the plaintext of the private key. In some embodiments, a subset of the encryption key serves as a verification code, such as the first 4 values of the encryption key, which may have 12-24 values. In some embodiments, the first 4 values of the encryption key may also deterministically verify at least some concealed information on the card, such that if a user chooses, they may verify the card 101 with an issuer and also deterministically verify a portion of concealed information by revealing that portion (optionally without revealing the entirety of concealed information, although a user may choose to fully verify each aspect of the card deterministically by obtaining the plaintext of the private key, computing the public key, and computing a set of addresses). Here, for such a use case, the user is still guaranteed by the tamper-evident features that they are the only entity in possession of the private access information.

As described above, a component 145 of the mask 140 may be tamper-evident, such as by one or more of the tamper-evident means disclosed herein, like one or more layers having one or more tamper-evident features like a backing adhesive adhering a layer to a card blank 105 that when the layer is lifted reveals a pattern, scratch-off surface layer, and the like. Thus, for example, prior user verification of the card by a verification portion of the concealed information 247 may be evident by removal of a portion 140A of the mask concealing the verification code information.

In some embodiments, uses may also utilize one or other verification measures, such as by inspecting the physical card 101 for features associated with the product. For example, a component 121 may have a top layer of material on which or within which a scent is imbedded (which may be promoted via scratching at the surface). A user may lightly scratch a surface of the component 121 and detect the scent to verify authenticity. In another example, a user may inspect one or more metallic flake emblems, holograms, or other images or imbedded materials in the component 121.

Figure 3A:
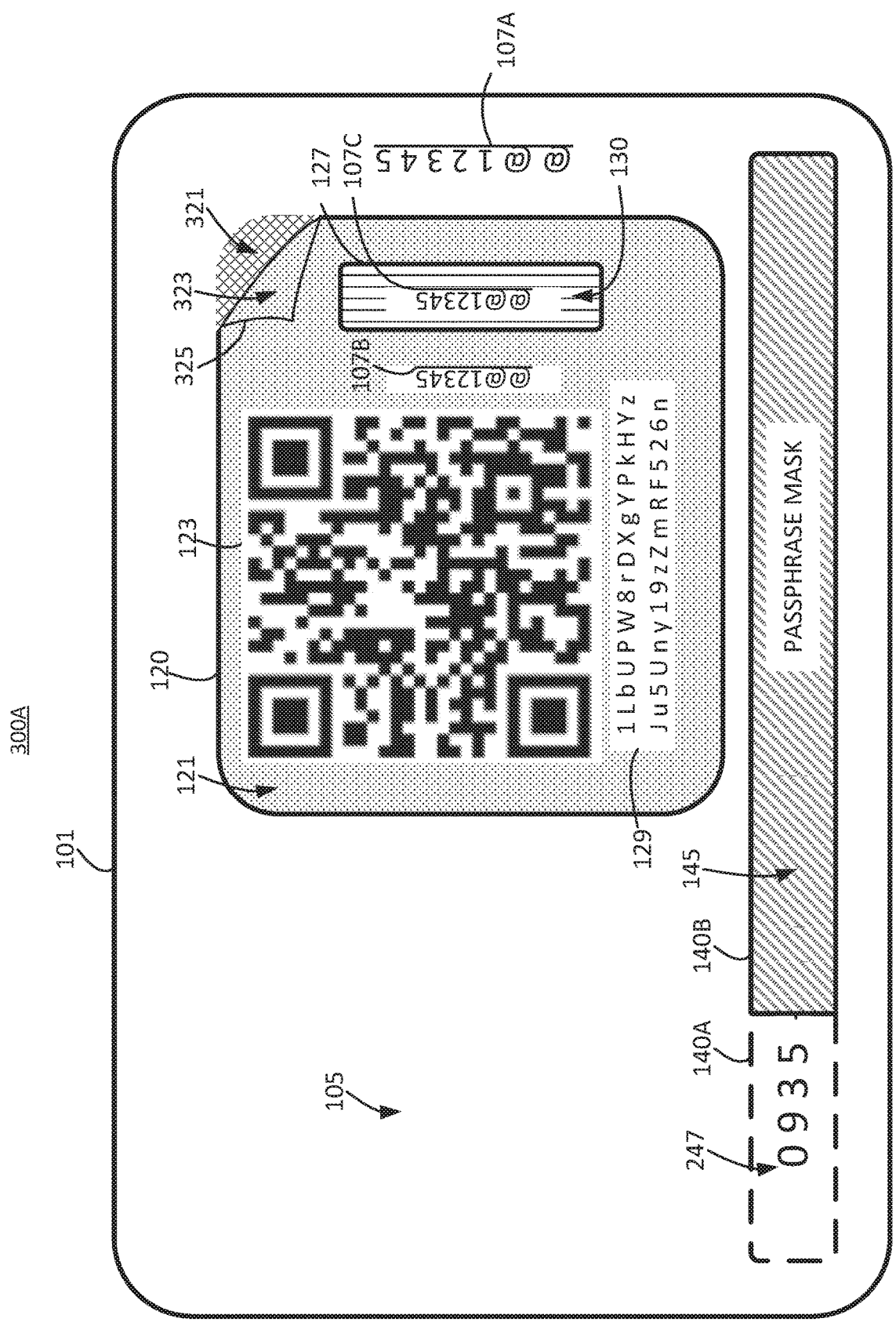
FIG. 3A illustrates an example of a currency card including a tamper-evident top-component of a multi-component sticker, according to some embodiments.

FIG. 3A illustrates an example 300A of a currency card including a tamper-evident top-component 121 of a multi-component sticker 120, according to some embodiments. Compared the examples of FIG. 2 (or FIG. 1A or FIG. 1B), FIG. 3A illustrates a lifted 325 portion of a tamper-evident component 121.

As shown, a residue, like a tamper-evident pattern 321 of an adhesive layer or layer having an applied adhesive may remain adhered to a surface of a card blank 105 when a corresponding portion of a tamper-evident component 121 adhered to the surface of the card blank is lifted 325 away. For example, the tamper-evident pattern 321 evident on the surface of the card may be a respective portion of the pattern formed in an adhesive layer or a lower layer of the component 121 that is configured to remain adhered to the surface of the card. Examples may include remaining adhesive, which may form a pattern, or remaining adhesive pattern layer, evident upon visual inspection.

In addition, a tamper-evident pattern 323 may be evident in the component 121, like a respective portion of the pattern formed in an adhesive layer or a lower layer of the component 121 that is configured to remain adhered to (e.g., is retained by) the component 121 when the component 121 lifted 325 from surface of the card blank 105. Thus, in some embodiments, the tamper-evident pattern 323 visible on the component 121 may appear as an inverse of the tamper-evident pattern 321 visible on the surface of the card blank 121. For example, if the pattern is a honeycomb-like pattern of hexagons, residue pattern 321 may be a plurality of hexagons and retained pattern 323 may be plurality of borders surrounding the hexagons, or vice versa. Alternatively, for a checkerboard-like pattern of squares, residue pattern 321 may be a plurality of offset squares (e.g., corresponding to red squares of a checkerboard if the black squares were removed) and retained pattern 323 may be a plurality of oppositely offset squares (e.g., corresponding to the black squares of a checkerboard that were removed). Other patterns or designs, whether randomly generated or having a specific structure, or tearing are equally applicable; the tamper-evidence aspect resulting from a first portion remaining as residue 321 on the surface of the card blank 105 and a second, opposing portion being retained 323 by the component 121 when lifted. In some embodiments, a residue portion 321 of the pattern may be distorted on the surface of the card blank 105 or a retained portion 323 of the pattern may be distorted on the lifted portion of the component 121 due to a lifting 325 away of the component 121. In some embodiments, a swatch disposed in the surface of the card blank 105 promotes the physical stripping away of the portion of the tamper-evident pattern 321 that remains on the surface of the card blank from the component 121.

As described above, the component 121 of the sticker 120 may encapsulate (e.g., envelope, cover, hide, enclose, or otherwise conceal) at least some private access information, whether that private access information is disposed on the surface of the card blank 105, on a bottom-component 130 of a multi-component sticker, or both. Accordingly, a tamper-evident feature of the component 121, like a bifurcation of an adhesive, adhesive layer, or a layer adhered to the surface of the card blank, such that some portion of the component 121 is physically stripped away (e.g., and remains on the surface of the card blank 105) while another portion is physically retained by the component 121 visibly displays evidence of tampering both on the surface of the card blank 105 and on the component 121. Moreover, because some portion of the component 121 is physically removed, a nefarious party cannot return the component 121 to original appearance. As a result, a user can visually inspect a card 101 to determine whether the private access information has been previously accessed.

Figure 3B:
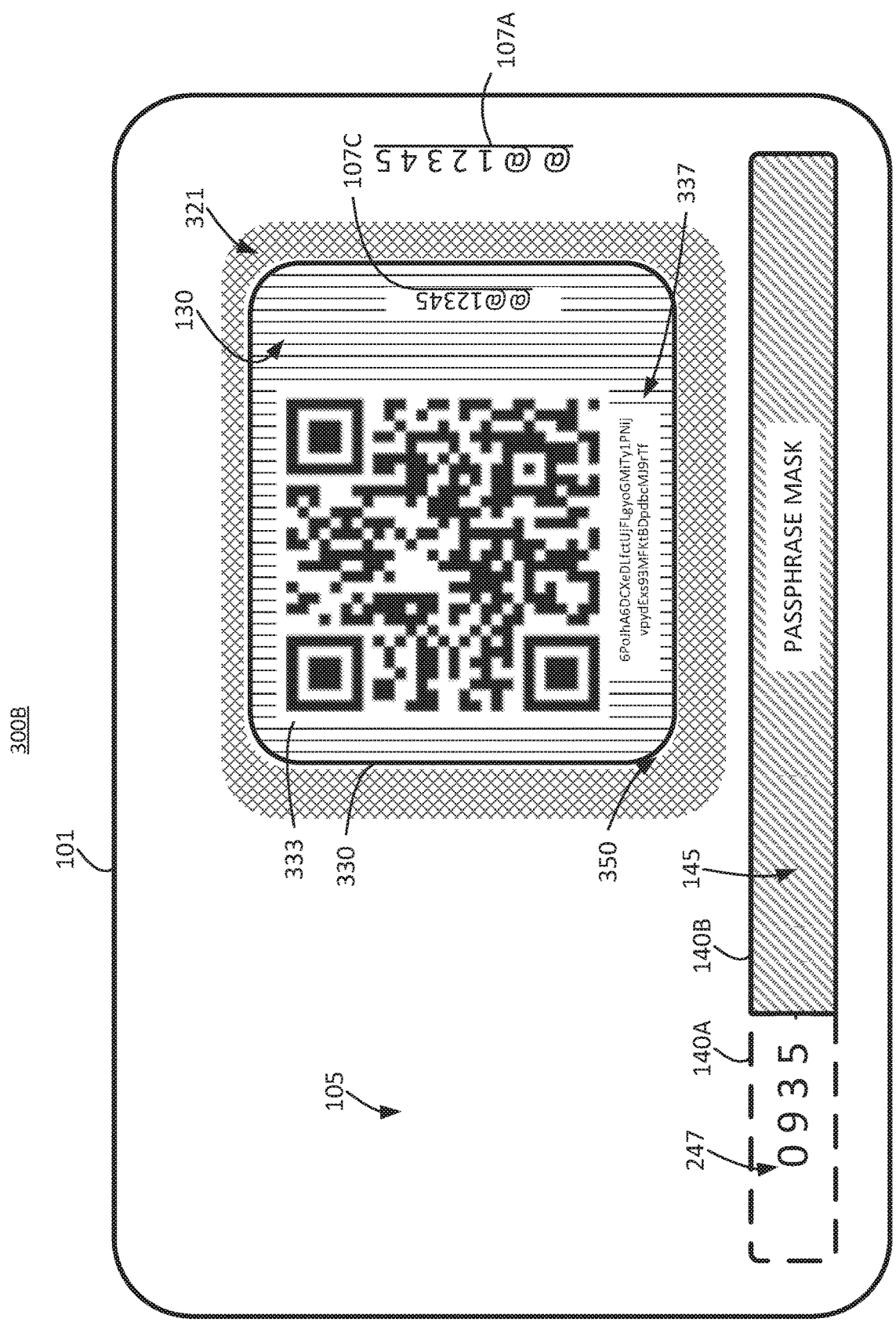
FIG. 3B illustrates an example of a currency card showing a tamper-evident effect after removal of a tamper-evident top-component of a multi-component sticker to expose a bottom-component of the multi-component sticker, according to some embodiments.

FIG. 3B illustrates an example 300B of a currency card 101 showing a tamper-evident effect after removal of a tamper-evident top-component of a multi-component sticker 120 to expose a bottom-component 130 of the multi-component sticker, according to some embodiments. Compared the examples of FIG. 3A (or FIG. 1A, FIG. 1B, or FIG. 2), FIG. 3B illustrates a physical currency card 101 subsequent to removal of a tamper-evident component (e.g., component 121 in FIG. 3A) concealing private access information.

As shown, a residue, like a tamper-evident pattern 321 of an adhesive layer or layer having an applied adhesive may remain adhered to a surface of a card blank 105 when a tamper-evident component (e.g., component 121 in FIG. 3A) previously adhered to the surface of the card blank has been removed. For example, the tamper-evident pattern 321 evident on the surface of the card may correspond to an area on the surface of the card blank 105 to which the tamper-evident component was adhered, the pattern corresponding to a portion of a pattern formed in an adhesive layer or a lower layer of the component and configured to remain adhered to the surface of the card. Examples may include remaining adhesive, which may form a pattern, or remaining adhesive pattern layer, evident upon visual inspection.

As described above, the tamper-evident component (e.g., component 121 in FIG. 3A) may encapsulate (e.g., envelope, cover, hide, enclose, or otherwise conceal) at least some private access information, whether that private access information is disposed on the surface of the card blank 105, on a bottom-component 130 of a multi-component sticker, or both. Here, a bottom-component 130 of a multi-component sticker is shown. In some embodiments, some or all of the information printed on the bottom-component 130 may be disposed on the surface of the card blank 105, such as within an area corresponding to the illustrated bottom-component 130. Some embodiments may include the information in addition to, or instead of, the bottom-component 130 (e.g., such that if the bottom-component 130 is destroyed or unreadable, private access information disposed in the surface of the card blank 105 may be utilized to access digital bearer assets that were transferred to an address associated with the card 101).

As shown, a bottom-component 130 of a multi-component sticker is revealed when a top-component of the multi-component sticker is removed from the card 101. The bottom-component 130, like the top-component, may be a sticker 330. In some embodiments, the bottom-component 130 is formed as a sticker 330 and applied to the surface of the card blank 105 (e.g., within a center of a swatch or within a designated area having a swatch) prior to positioning of a top-component. The top-component (e.g., component 121 in FIG. 3A) having tamper-evident features may also be formed as a sticker (e.g., sticker 120 in FIG. 3A), positioned over the sticker 330, and applied such that it conceals at least some information on sticker 330 and also adheres to at least some portions of the surface of the card blank 105 (e.g., an area surrounding, or at least partially surrounding the sticker 330). In turn, when the tamper-evident top-component is removed, a tamper-evident pattern 321 within areas surrounding the component is revealed when the top-component is removed. Thus, for example, the bottom-component 130 may be a sticker 330 and the top-component may also be a sticker, which are formed separately and applied in sequence to create a multi-component sticker. In some embodiments, the bottom-component 130 may be a sticker 330, and the top-component may also be a sticker, which are formed separately and merged to form a single multi-component sticker prior to application thereof to the surface of the card. In some embodiments, the bottom-component 130 may be formed, and the top-component is formed over the bottom-component to form a single-multi-component sticker prior to application thereof to the surface of the card. Regardless of the specific process, a bottom-component 130 may comprise private access information concealed by the top-component.

In some embodiments, the bottom-component 130 has at least a portion of other information visible while the top-component is positioned to conceal the private access information. In some embodiments, the bottom-component 130 has an upper-layer of material or a coating to which the adhesive of the top-component adheres less strongly to than a surrounding portion of the currency card (e.g., the surface of the card, which may include a swatch). In some embodiments, the top-component comprises a different adhesive corresponding to a surrounding portion than a center concealed portion. In some embodiments, the bottom-component 130 has an applied a coating, like a UV protective coating, or a sealant, which may be a layer of film or other coating, such that the top-component adheres less strongly to its surface than the surrounding area within which the tamper-evident pattern 321 is promoted and that strength of the adhesion is less than a threshold strength of adhesion sufficient to promote tamper-evidence such that removal of the top-component does not substantially obfuscate the private access information below upon removal. In some embodiments, the bottom-component 130 causes tamper-evidence to appear in a corresponding lifted portion of the top-component but without substantial residue remnants (or affords ease of removal thereof) on the bottom-component. For example, removal of the top-component may cause residue (or a portion of the adhesive layer) to remain on the portion of the card surrounding the bottom-component 130 but not on the bottom-component itself, but which may be adhere within a threshold strength sufficient to cause distortion of a pattern in the lifted top-component.

In some embodiments, the top-component comprises two different adhesives, a center adhesive corresponding to an area of the bottom-component 130 being different than a surrounding adhesive corresponding to the surrounding portion of the currency card. In some embodiments, the tamper-evident pattern is not promoted (e.g., applied) within the center area of the adhesive layer or layer adjacent to the adhesive but within the surrounding area corresponding to the surrounding portion of the currency card. In some embodiments, the top-component comprises a first layer of film adjacent to the adhesive corresponding to the center area but not the surrounding area and a subsequent layer overlapping the first layer and having dimensions corresponding to the surround area, the second layer having tamper evident features such that the tamper-evident pattern 321 is promoted in the surrounding area but a first layer corresponding to the area of the bottom-component 130 may be removed (either with the top-component or subsequent thereto) without leaving residue. In some embodiments, that first layer has a scratch-off coating, by which the private access information may be revealed, or in some embodiments, that first layer may be a top-layer of the bottom-component.

In some embodiments, removal of the top-component leaves a gap 350 between the bottom-component 130 and the surrounding tamper-evident portion 321. In some embodiments, the tamper-evident portion 321 corresponds to a swatch etches on the currency card, which may have a corresponding gap 350 between an outer swatch promoting adhesion of the top-component and an inner swatch promoting adhesion of the bottom-component 130.

As shown, private access information disposed on the bottom-component 130 (or information disposed in corresponding areas of the surface of the card blank) was substantially concealed (e.g., other than a window or cutout corresponding to the unique identifier portion 107C of the bottom-component) by the top-component and is revealed upon removal of the top-component. In some embodiments, the information that was concealed by the top-component comprises private access information. For example, as shown, the concealed portion of the bottom-component 130 may include another optical code portion 333 and an alphanumeric portion 337, which may correspond to a private key by which accounts based on a corresponding public key in the public-private key pair may be accessed. For example, an optical code, like a QR code, disposed within the optical code portion 333 may encode the private key which may be reproduced in alphanumeric text within the alphanumeric text portion 337. Alternatively, and to increase security (such as by forcing a nefarious party to access addition information concealed by a tamper-evident component 145 of a mask 140, and for other purposed discussed in more detail with reference to FIG. 7), the optical code and alphanumeric text, rather than corresponding to the private key directly, may correspond to a cipher text of the private key, the plaintext of which is the private key of the key pair by which the associated accounts may be accessed. To generate the ciphertext, the plaintext of the private key (or other private information) may encrypted with a symmetric encryption protocol utilizing information 247 (e.g., an encryption key, like a passphrase) concealed by at least portion 140B of the mask 140 (and optionally portion 140A in instances where the verification code is a first portion of the encryption key). In some embodiments, the encryption key is operable to decrypt the ciphertext by a corresponding symmetric decryption protocol to reveal the plaintext of the private key of the key-pair. Thus, in some example embodiments, a user must remove the tamper-evident top-component to reveal the ciphertext and remove or scratch off the mask 140 to reveal the encryption key in order to ascertain the plaintext of the private key.

Figure 4:
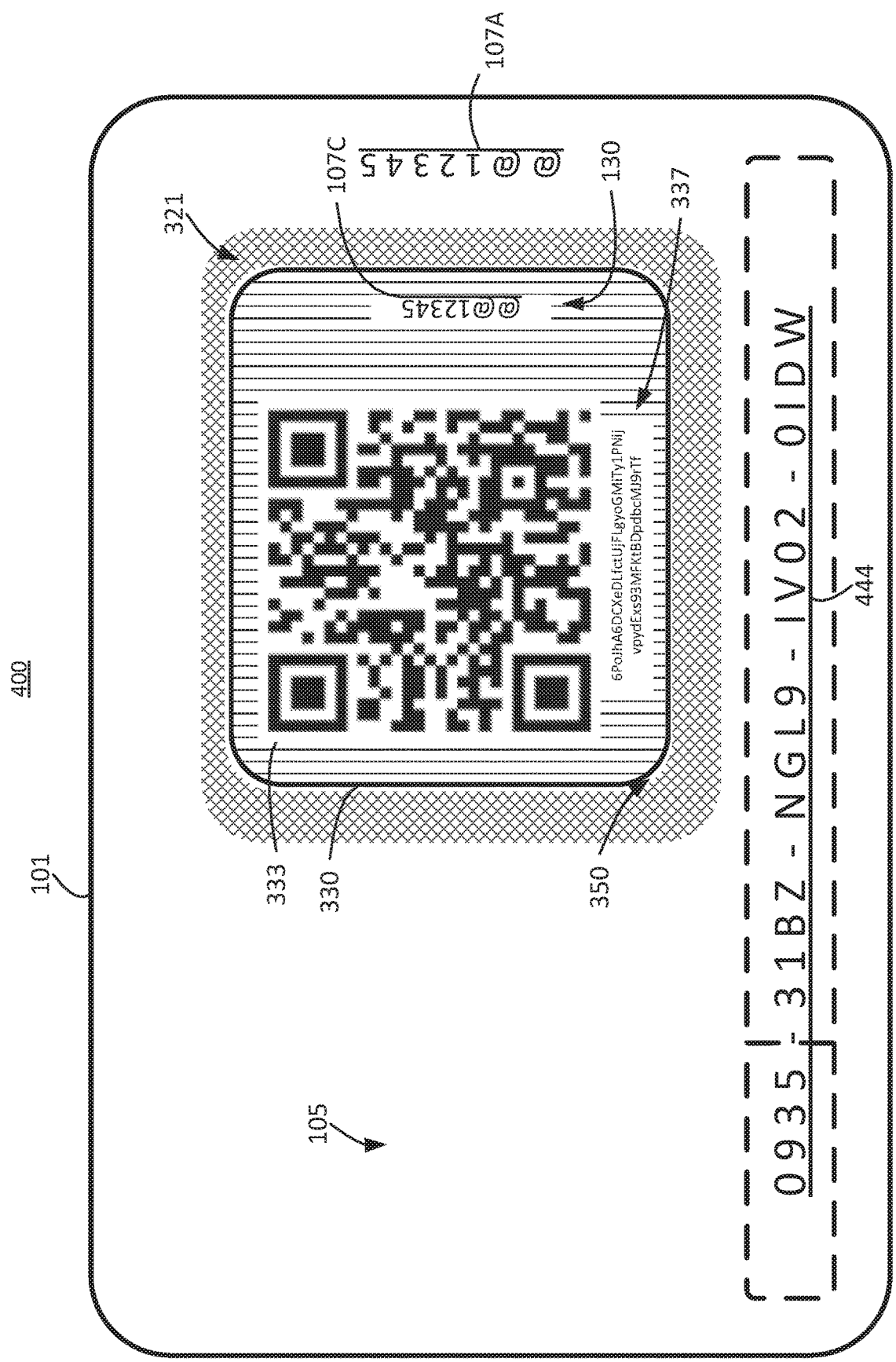
FIG. 4 illustrates an example of a currency card including an exposed bottom-component of a multi-component sticker and cryptographic passphrase, according to some embodiments.

FIG. 4 illustrates an example 400 of a currency card including an exposed bottom-component of a multi-component sticker and cryptographic passphrase, according to some embodiments. Compared the examples of FIG. 3B (or FIG. 1A, FIG. 1B, FIG. 2, or FIG. 3A), FIG. 4 illustrates a physical currency card 101 subsequent to removal of a tamper-evident component (e.g., component 121 in FIG. 3A) concealing private access information in ciphertext and removal (e.g., by peeling away or scratching off a surface) of a mask (e.g., component 145 in FIG. 3B) concealing an encryption key (like a passphrase) by which private access information in plaintext can be obtained from the ciphertext.

As shown, the information that was concealed by the mask may be an encryption key 444 of an symmetric encryption protocol that was utilized to encrypt the private access information (e.g., the private key) of the key pair to produce the ciphertext printed within the alphanumeric ciphertext portion 337 of the bottom-component 130. The optical code, like a QR code, may be an encoding of the ciphertext which is printed within the optical code portion 333 of the bottom-component. Example symmetric encryption protocols include, but are not limited to, AES-128, AES-192, AES-256, and the like. In some embodiments, a protocol corresponding to a decentralized computing platform is utilized. For example, a Bitcoin Improvement Protocol (e.g., BIP38) or other protocol may specify one or more protocols by which a private key may be protected with an encryption key or passphrase. In some embodiments, an encryption function of a protocol takes, as input, a plaintext private key (e.g., in a given format) and an encryption key or passphrase (e.g., in a given format) by which the ciphertext of the private key is generated (or protected by under the protocol) and corresponds (e.g., uniquely) to the ciphertext in the given protocol. In some embodiments, a portion of the encryption key or passphrase may be a checksum, like a verification code, by which a user may verify the ciphertext. A decryption function of the protocol may take, as input, a ciphertext private key (e.g., in a given format) and the corresponding encryption key or passphrase, which may be input by a scanning of the optical code and keying in or optical character recognition or separate optical code of the encryption key or passphrase. In turn, the decryption function of the protocol outputs the plaintext private key backing the accounts corresponding to the currency card.

Figure 5C:
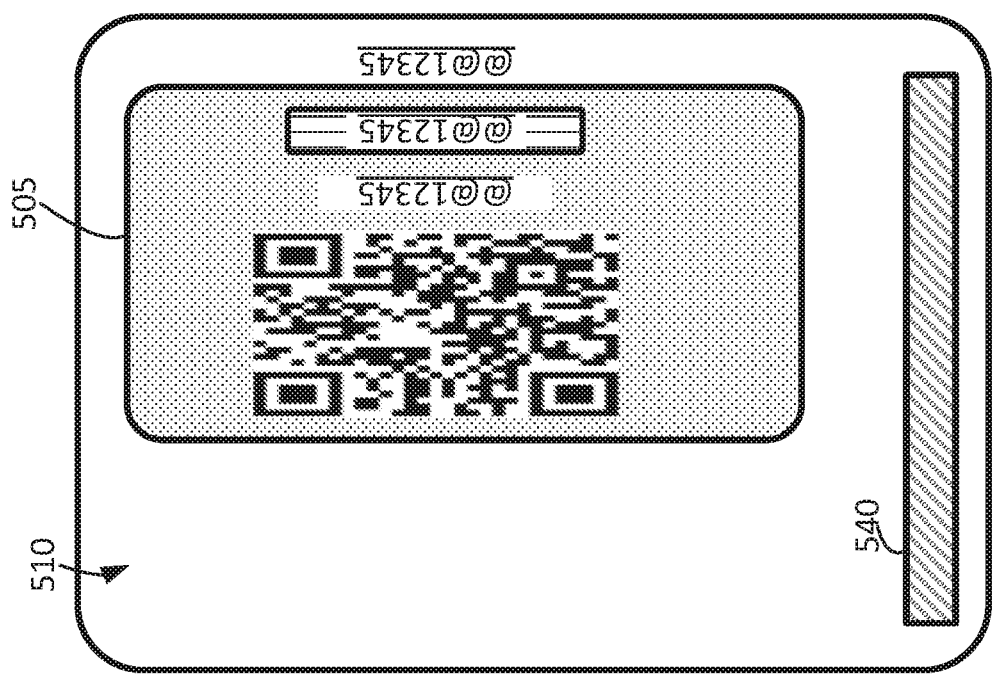
FIG. 5A, FIG. 5B, and FIG. 5C illustrate an example multi-layer sticker construction and application for a physical currency card, according to at least some embodiments.
Figure 5B:
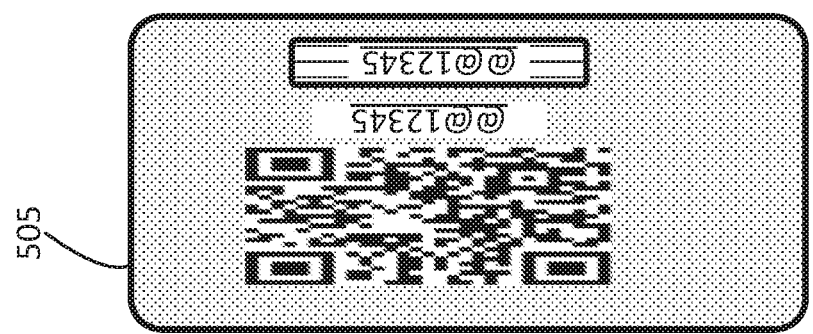
Figure 5A:
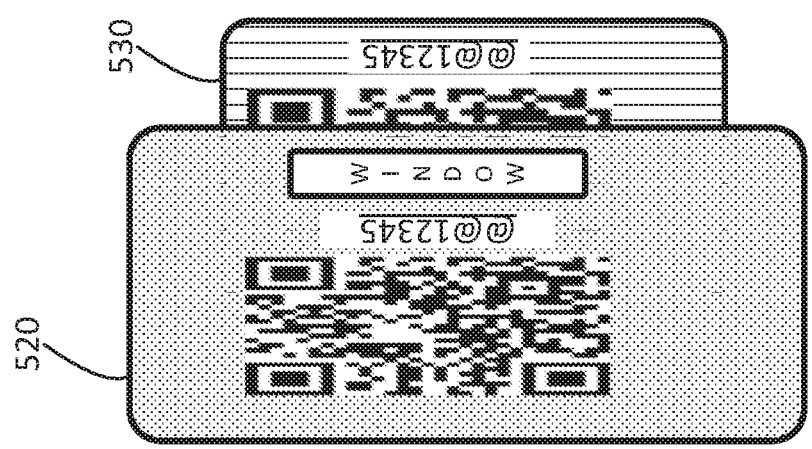

FIGS. 5A, 5B, and 5C illustrate an example sequence of forming a multi-component sticker and currency card, according to various embodiments described herein.

FIG. 5A illustrates an alignment of a top-component 520 and a bottom-component 530 of a multi-component sticker, according to at least some embodiments. The bottom-component 530 includes a first information portion that is encapsulated (e.g., enveloped, covered, hidden, enclosed, or otherwise concealed) by the top-component 520. The bottom-component 530 includes a second information portion visible through a window of the top-component 520. Thus, for example, the bottom-component 530 and top-component 520 may be aligned to produce a multi-component sticker. In some embodiments, the bottom-component 530, as a result of the alignment, includes a portion concealed by the top-component 520 (e.g., the portion including private access information) and another portion that is visible when the top-component 502 is aligned (e.g., the portion including a unique identifier or other non-concealed information disposed on the bottom-component). For example, the top-component 520 may be placed (or formed) in position over (e.g., above) the bottom-component 530 on a roll of stickers, or they may be applied separately in sequence to a currency card (e.g., the bottom-component 530 followed by the top-component 520).

FIG. 5B illustrates a multi-component sticker 505, according to at least some embodiments. As shown, the window portion of the top-component of the multi-layer sticker 505 exposes the second information portion of the bottom-component. The second information may be a unique identifier printed on both the top-component and the bottom-component of the multi-layer sticker for inspection. For example, a user may inspect the unique identifiers to verify a match between the top-component and the bottom-component.

FIG. 5C illustrates a multi-component sticker 505 applied to a currency card 510, according to at least some embodiments. In some embodiments, a portion of the currency card 510 to which the sticker 505 is applied comprises a swatch to promote adhesion. In some embodiments, the currency card 510 includes a unique identifier disposed thereupon having correspondence to the unique identifier of the sticker 505. For example, the unique identifier may be visible on a bottom-component of the sticker via a window of the top-component, and the top-component may also include the unique identifier. Accordingly, a matching of the components of the sticker 505 and the card 510 to ensure that the information printed on the different components of the sticker 505 and information disposed on the card 510 (e.g., under a mask 540) are collectively operative.

Figure 6A:
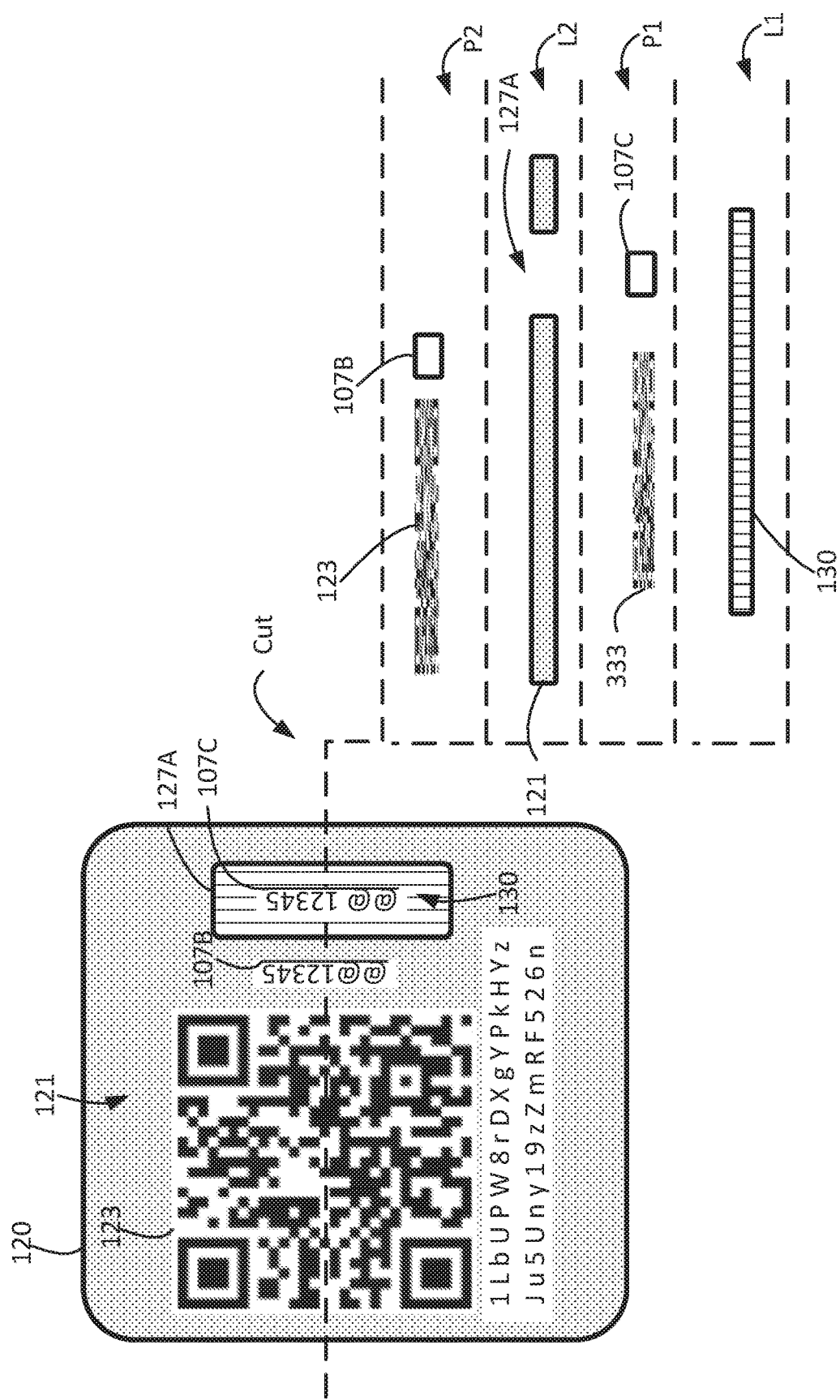
FIG. 6A and FIG. 6B illustrate examples of a multi-component sticker, according to some embodiments.
Figure 6B:
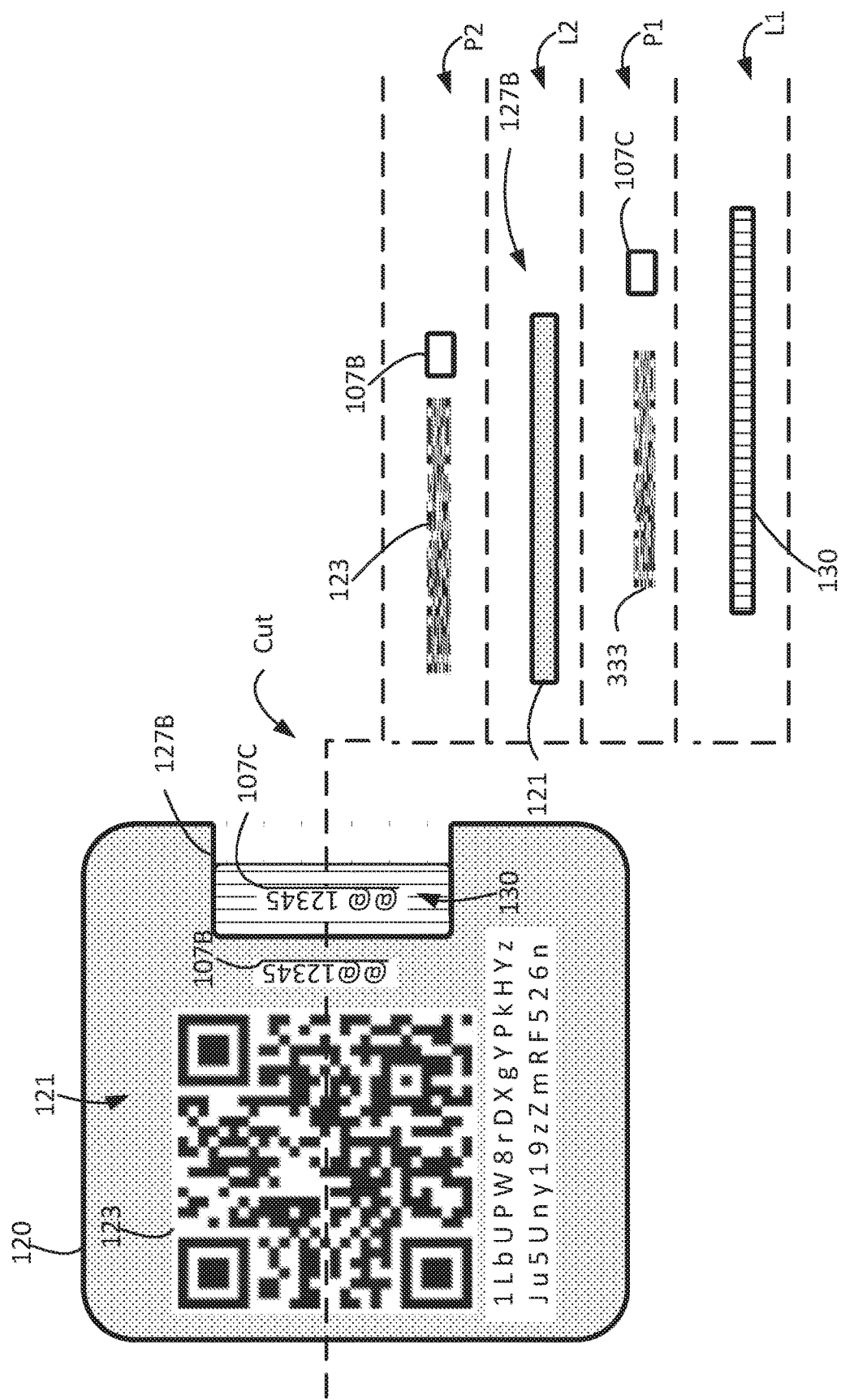

FIG. 6A and FIG. 6B illustrate examples of a multi-component sticker 120, according to some embodiments. In each of FIG. 6A and FIG. 6B, a cut is shown through the multi-component sticker 120 to illustrate the example configurations of the different components.

FIG. 6A illustrates example multi-component sticker 120 having a top-component 121 and a bottom-component 130. As shown, along the cut, the top-component 121 includes an optical code portion 123, a unique identifier portion 107B, and a window 127A. Within the window 127A, a portion of the bottom-component 130 is visible. The visible portion may correspond to a unique identifier portion 107C of the bottom-component 130 such that the multi-component sticker 120 may be visually inspected to ascertain whether the different components 121, 130 having different information printed thereon in optical code portions correspond to each other.

As shown, a bottom-component 130 may correspond to a first layer, L1, of the multi-component sticker 120. Upon the bottom-component 130, information may be printed thereon, such as first printed information, P1. The first printed information may include, along the cut, an optical code portion 333 and a unique identifier portion 107C. Private access information, like a private key of a public-private key-pair, or ciphertext hereof may be encoded as an optical code that is printed within the optical code portion 333 of the bottom-component. Similarly, a unique identifier may be printed within the unique identifier portion 107C, and the unique identifier portion 107C may correspond to an area of the bottom-component that is aligned with a window 127A of a top-component 121.

As shown, a top-component 121 may correspond to a second layer, L2, of the multi-component sticker 120. Upon the top-component 121, information may be printed thereon, such as second printed information, P2. The second printed information may include, along the cut, an optical code portion 123 and a unique identifier portion 107B. Public access information, like a public key (that corresponds to the above noted private key) or an address based on the public key and in a format of a decentralized computing platform, may be encoded as an optical code that is printed within the optical code portion 123 of the top-component. Similarly, a unique identifier may be printed within the unique identifier portion 107B. Within the top-component 121, a window 127A may be formed, such as by a removal of that area from the top-component (e.g., punching or cutting out the portion). As shown, the window 127A is aligned with an area (e.g., a unique identifier portion 107C) of the bottom-component 130 within which a unique identifier is printed, such that the unique identifier is visible through the window 127A in the multi-component sticker 120. Notably, at least some other information, like the private access information printed on the bottom-component 130, is encapsulated (e.g., enveloped, covered, hidden, enclosed, or otherwise concealed) by the top-component 121. Accordingly, as shown, the top-component 121 may have edges that extend beyond the edges of the bottom-component 130 in at least three directions (four are shown in the illustrated embodiments) but at least some information, like a unique identifier, that is printed on the bottom-component 130 remains visible when the top-component 121 is so configured and positioned to form the multi-component sticker 120 with the bottom-component 130. In other words, the top-component 121 may extend beyond at least a portion of the perimeter of the bottom component, such as along 60-90% of the perimeter of the bottom-component 130, to conceal at least some information disposed on the bottom-component and ensure that a user must lift away the top-component 121 to ascertain some or all of the concealed information disposed on the bottom-component 130. Thus, for example, while rectangular components are shown, other shapes may be utilized and the components may have different shapes (e.g., a first may be a circle and the other a rectangle).

FIG. 6B illustrates example multi-component sticker 120 having a top-component 121 and a bottom-component 130. As shown, along the cut, the top-component 121 includes an optical code portion 123, a unique identifier portion 107B, and a window 127B. Within the window 127B, a portion of the bottom-component 130 is visible. The visible portion may correspond to a unique identifier portion 107C of the bottom-component 130 such that the multi-component sticker 120 may be visually inspected to ascertain whether the different components 121, 130 having different information printed thereon in optical code portions correspond to each other.

As shown, a bottom-component 130 may correspond to a first layer, L1, of the multi-component sticker 120. Upon the bottom-component 130, information may be printed thereon, such as first printed information, P1. The first printed information may include, along the cut, an optical code portion 333 and a unique identifier portion 107C. Private access information, like a private key of a public-private key-pair, or ciphertext hereof may be encoded as an optical code that is printed within the optical code portion 333 of the bottom-component. Similarly, a unique identifier may be printed within the unique identifier portion 107C, and the unique identifier portion 107C may correspond to an area of the bottom-component that is aligned with a window 127B of a top-component 121.

As shown, a top-component 121 may correspond to a first layer, L1, of the multi-component sticker 120. Upon the top-component 121, information may be printed thereon, such as second printed information, P2. The second printed information may include, along the cut, an optical code portion 123 and a unique identifier portion 107B. Public access information, like a public key (that corresponds to the above noted private key) or an address based on the public key and in a format of a decentralized computing platform, may be encoded as an optical code that is printed within the optical code portion 123 of the top-component. Similarly, a unique identifier may be printed within the unique identifier portion 107B. Within the top-component 121, a window 127B may be formed, such as by a removal of that area from the top-component (e.g., punching or cutting out the portion). As shown, the window 127B is aligned with an area (e.g., a unique identifier portion 107C) of the bottom-component 130 within which a unique identifier is printed, such that the unique identifier is visible through the window 127B in the multi-component sticker 120. Notably, at least some other information, like the private access information printed on the bottom-component 130, is concealed by the top-component 121. Accordingly, as shown, the top-component 121 may have edges that extend beyond the edges of the bottom-component 130 in at least three directions (four are shown, but with a partial edge of the bottom-component 130 exposed within the window 127B), but at least some information, like a unique identifier, that is printed on the bottom-component 130 remains visible when the top-component 121 is so configured and positioned to form the multi-component sticker 120 with the bottom-component 130. In other words, the top-component 121 may extend beyond at least a portion of the perimeter of the bottom component, such as along 60-90% of the perimeter of the bottom-component 130, to conceal at least some information disposed on the bottom-component and ensure that a user must lift away the top-component 121 to ascertain some or all of the concealed information disposed on the bottom-component 130. Thus, for example, while rectangular components are shown, other shapes may be utilized and the components may have different shapes (e.g., a first may be a circle and the other a rectangle).

Further, as can be seen, the top-component 121 is disposed (or positioned) above the bottom-component 130 (e.g., normal to a surface of application below layer L1), such as to overlap and concealed some information 333 disposed on the bottom-component 130 while some other information 107C remains visible. In other words, the top-component 121 may encapsulate (e.g., envelope, cover, hide, enclose, or otherwise conceal) information 333 printed on the bottom-component 130. Notably, as the top-component 121 extends beyond the perimeter of the bottom-component 130 along at least some portions, above need not mean physically-above, as those portions of the top-component 121 extending beyond the perimeter of the bottom-component 130 need not be physically above one or more layers of the bottom-component 121 (e.g., in areas other than those in which the top-component 121 and bottom-component 130 overlap). Thus, as referred to herein, above can refer to a sequence of application or position for some portion of a layer but need not apply to all portions of the layer, e.g., layer L2 is physically above layer L1 where layer L2 overlaps with layer L1, and layer L2 is disposed above layer L1, but the extant portions of layer L2 that extend beyond the perimeter of layer L1 need not be physically above layer L1. For example, the extant portions of layer L2 that extend beyond the perimeter of layer L1 may adhere to a surface having a same height as that corresponding to layer L1 (although not required as, for example, a surface area corresponding to layer L1 may be countersunk in relation to a surface area corresponding to the extant portions of layer L2 or the surface area corresponding to the extant portions of layer L2 may be raised).

FIG. 6C, FIG. 6D, FIG. 6E, and FIG. 6F illustrate examples of components of a multi-component sticker, according to some embodiments. As described previously, a component may include multiple layers (e.g., a multi-layer component), these figures illustrate various examples of forming a component with multi-layers.

Figure 6C:
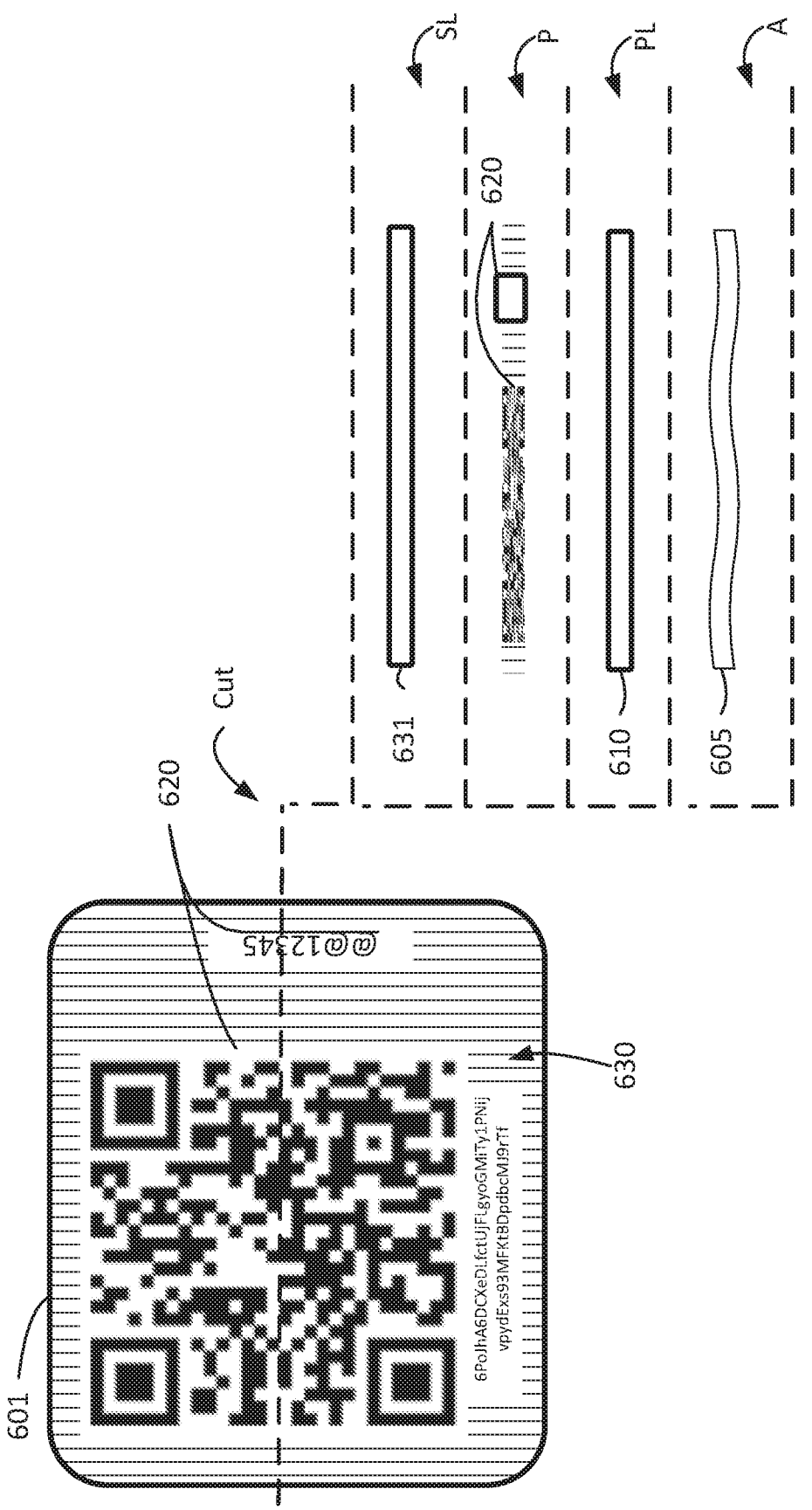

FIG. 6C illustrates an example multi-layer component, such as a bottom-component 630 having multiple layers. In some embodiments, the bottom-component 630 is formed as a sticker 601 that is later matched with another component sticker, like a top-component, to form a multi-component sticker. A cut through the component 630, which passes through the various layers is shown.

The example component 630 may include an adhesive layer, A, which includes an adhesive 605. The adhesive 605 may be formed as a layer or otherwise applied to an adjacent layer, PL, in the illustrated example.

The example component 630 may include a print layer, PL, like a layer 610 of PET or PP, on which information 620 is printed. In some embodiments, a layer 610 of PET or BOPET film is utilized for the print layer. The printing, P, of the print layer PL may utilize any applicable printing process. In some embodiments, a charged ink transfer process is utilized, and may transfer the information 620 along with any pattern or design to the print layer, PL. For example, electrically chargeable ink particles corresponding to the information 620 may formed on the print layer. In some embodiments, the transfer printing process comprises heating and melting the ink particles into the print layer, such as by direct transfer of a mirror of the information.

The example component 630 may include a surface layer, SL, like a layer 631 of PET or PP, to protect the printed information 620 (e.g., from elements or abrasion). In some embodiments, a layer 631 of transparent PET, BOPET, or BOPP film is utilized for the surface layer (e.g., such that the printed information 620 remains visible on a surface of the component 630).

Figure 6E:
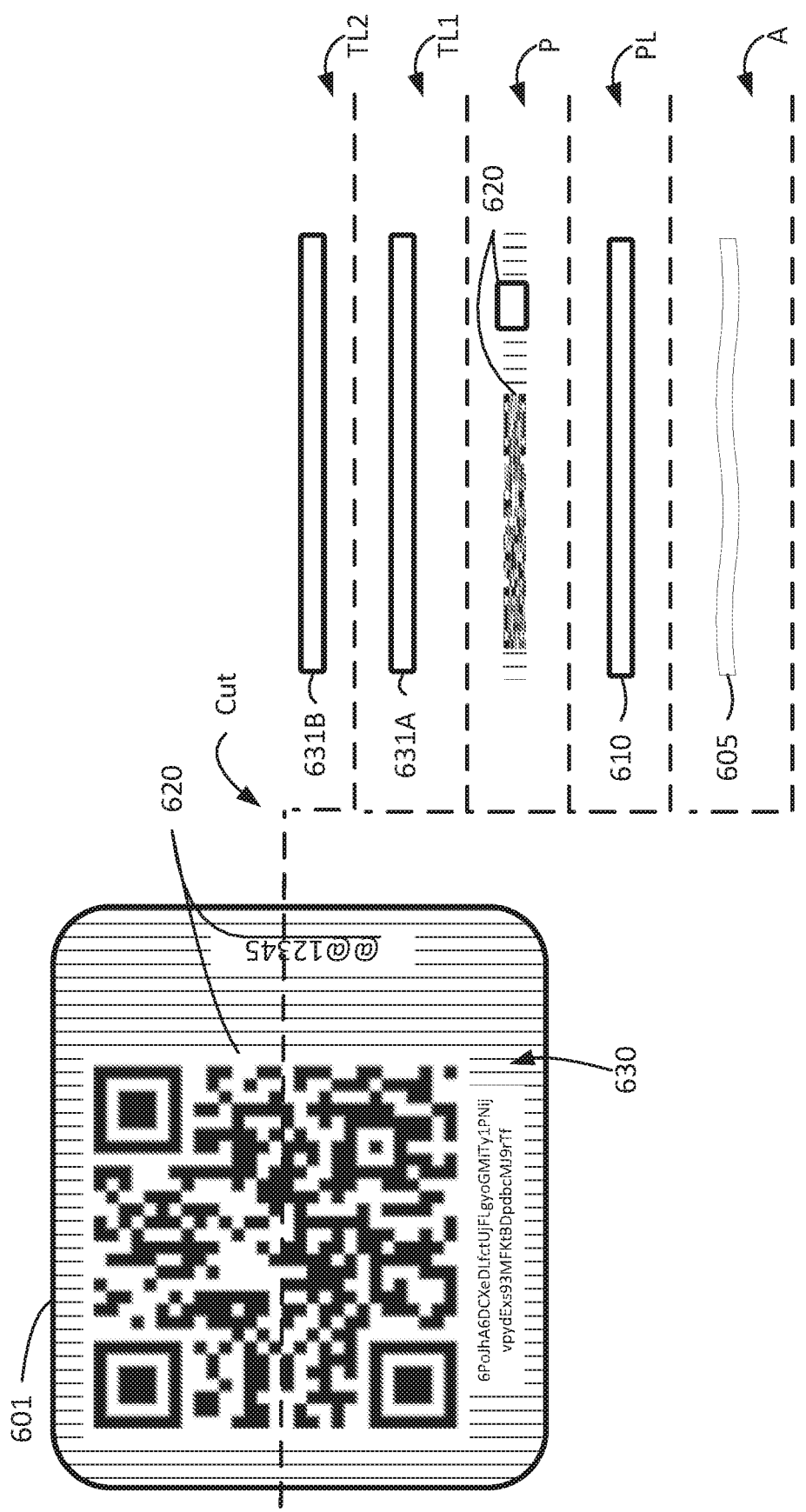

FIG. 6E illustrates an example multi-layer component, such as a bottom-component 630 having multiple layers. In some embodiments, the bottom-component 630 is formed as a sticker 601 that is later matched with another component sticker, like a top-component, to form a multi-component sticker. A cut through the component 630, which passes through the various layers is shown.

Compared to FIG. 6C, FIG. 6E illustrates multiple top layers, TL1, TL2 disposed above the print layer, PL rather than a single surface layer above the print layer. In some embodiments, a lower top layer 631A protects the printed information 620 (e.g., from one or more elements or abrasion). In some embodiments, a first layer 631A of transparent PET, BOPET, or BOPP film is utilized for the lower top layer 631A (e.g., such that the printed information 620 remains visible on a surface of the component 630). In some embodiments, an upper top layer 631B protects and conceals the printed information 620 (e.g., from view) or protects against one or more elements or abrasion, and those protective qualities may differ from the lower top layer 631A. In some embodiments, a second layer 631B of transparent PET, BOPET, or BOPP film is utilized for the lower top layer 631B (e.g., such that the printed information 620 remains visible on a surface of the component 630). In some embodiments, a second layer 613B comprises a scratch of material or metallized film (which in some cases may be foil-like or reflective) which may be removed to view the information 620 on the print layer but while in place prevents a scan from reading private access information printed on the bottom-component 601.

FIG. 6D illustrates an example multi-layer component, such as a top-component 660 having multiple layers. In some embodiments, the top-component 660 is formed as a sticker 602 that is later matched with another component sticker, like a bottom-component, to form a multi-component sticker. In some embodiments, the top-component 660 is formed over a bottom-component, such as by forming the illustrated layers over one or more existing layers. A cut through the component 660, which passes through the various layers is shown.

The example component 660 may include an adhesive layer, A, which includes an adhesive 607. The adhesive 607 may be tamper-evident and formed as a layer or otherwise applied to an adjacent layer, PL, in the illustrated example. In some embodiments, the adhesive 607 is colored and mitigates the passage of light therethrough (e.g., such that a material or information under the adhesive 607 is not visible). In some embodiments, the adhesive 607 may be reflective, such as to mitigate a scan of a material or information not visible under the adhesive 607. In some embodiments, a pattern is formed in the adhesive 607, like between the print layer, PL, and the adhesive, or underneath the adhesive. The pattern is formed such that when the print layer material, such as layer 640, is lifted away from a surface to which the adhesive 607 adheres the layer 640 to, a first portion of the adhesive 607 (e.g., corresponding to a first portion of the pattern) remains adhered to the layer 640 and a second portion of the adhesive 607 (e.g., corresponding to a second, opposing portion of the pattern) remains adhered to the surface to which the layer 640 was adhered. Accordingly, tampering with the component 660 such as by lifting the component (e.g., at least layer 640) away from the surface to which it was adhered to by the adhesive 607 provides indication of tampering.

The example component 660 may include a print layer, PL, like a layer 640 of PET or PP, on which information 650 is printed. In some embodiments, a layer 640 of PET or BOPET film is utilized for the print layer. The printing, P, of the print layer PL may utilize any applicable printing process. In some embodiments, a charged ink transfer process is utilized, and may transfer the information 650 along with any pattern or design to the print layer, PL. For example, electrically chargeable ink particles corresponding to the information 650 may formed on the print layer. In some embodiments, the transfer printing process comprises heating and melting the ink particles into the print layer, such as by direct transfer of a mirror of the information.

The example component 660 may include a surface layer, SL, like a layer 661 of PET or PP, to protect the printed information 650 (e.g., from elements or abrasion). In some embodiments, a layer 661 of transparent PET, BOPET, or BOPP film is utilized for the surface layer (e.g., such that the printed information 650 remains visible on a surface of the component 660). In some embodiments, one or more emblems may be embedded in the layer 661, like a foil emblem, which may be holographic or a foil design indicating authenticity of the component 660. In some embodiments, a scent is applied (e.g., like a coating) or otherwise impregnated into the layer 661, and which may be released when the surface is scratched.

In some embodiments, a window 127 is formed in the component 660. For example, a tool 695 may pass through the layers of the component 660 and remove that portion of the component to form a window. In some embodiments, the tool 695 may cut to a specific depth corresponding to the adhesive such that the adhesive and layers of the component 660 are removed without penetrating through an underlaying material. In some alternate embodiments, a tamper-evident adhesive 607 may not be disposed in an area corresponding to the window 127, for example, a transparent (or no adhesive) may be disposed within the area corresponding to the window 127. Further, within that area, the other layers may have a transparent portion such that an underlaying material or information on that material may be visible through the window 127.

Figure 6F:
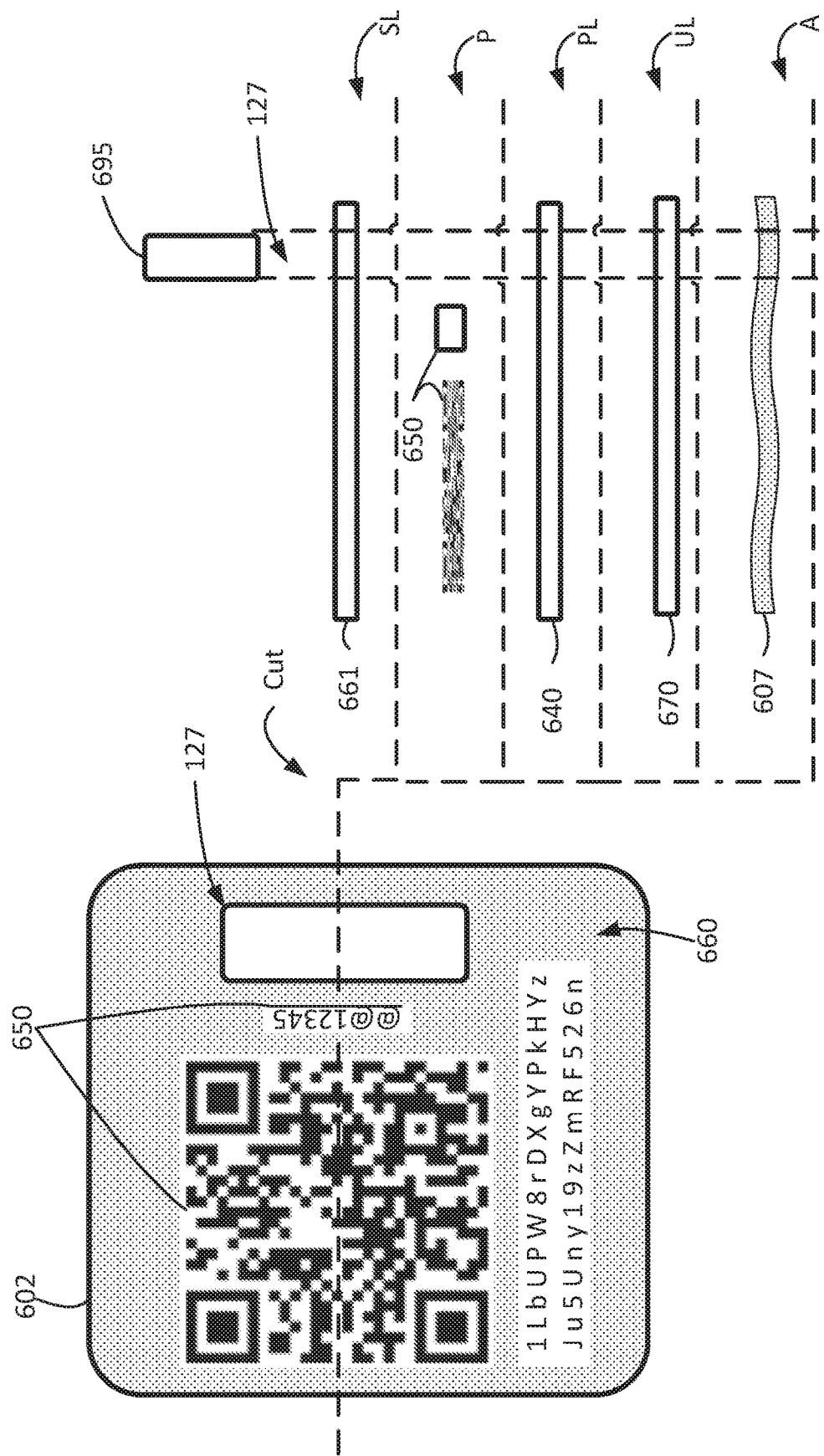

FIG. 6F illustrates an example multi-layer component, such as a top-component 660 having multiple layers. In some embodiments, the top-component 660 is formed as a sticker 602 that is later matched with another component sticker, like a bottom-component, to form a multi-component sticker. In some embodiments, the top-component 660 is formed over a bottom-component, such as by forming the illustrated layers over one or more existing layers. A cut through the component 660, which passes through the various layers is shown.

Compared to FIG. 6E, FIG. 6F illustrates an additional underlaying layer, UL, between the print layer, PL, and the adhesive layer, A. In some embodiments, the underlaying layer 670 includes one or more tamper-evident features or anti-tamper features to prevent a nefarious party from ascertaining information below the layer 670. In some embodiments, the layer 670 is a metalized PET, BOPET, or BOPP film or foil or pattern of foil or film by which underlaying information may be obfuscated. In some embodiments, layer 670 and the adhesive layer 607 both act to obfuscate information under the component 660 and may optionally include different tamper-evident features (e.g., visible in the component 660 or surface to which it adheres when the component 660 is tampered with) or anti-tamper features (e.g., preventing a scan or visual reading through the component 660) to conceal information underlaying the component 660, such as information printed a bottom-component or other surface to which the component 660 is adhered (e.g., information or surface area that is not visible through the window 127).

Figure 7:
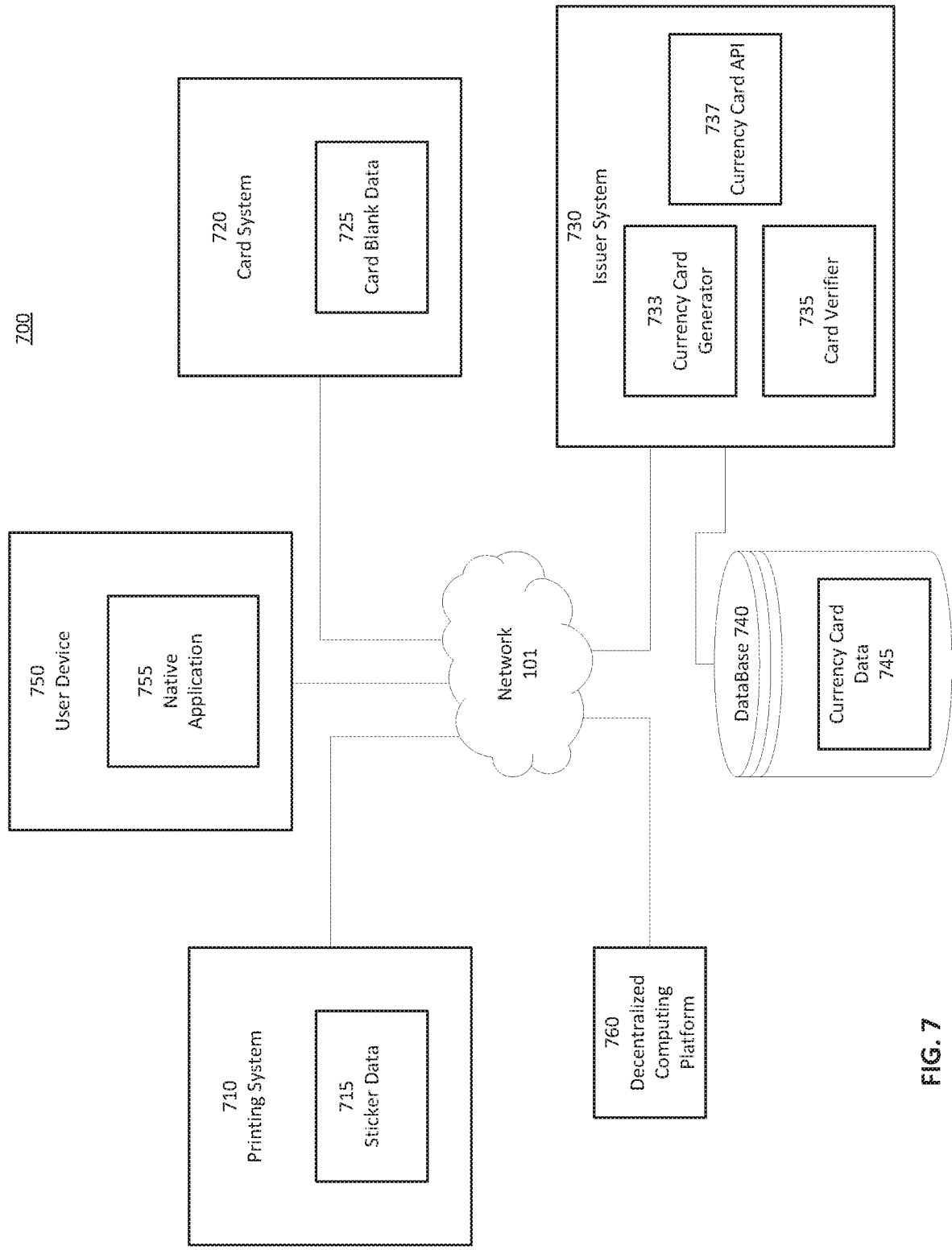
FIG. 7 illustrates an example computing environment within which a currency card may be implemented, according to some embodiments.

FIG. 7 illustrates an example computing environment 700 within which a currency card may be implemented, according to some embodiments. In some embodiments, the card is robust to supply chain attacks. In some embodiments, the example computing environment 700 is configured to implement a manufacturing process that enhances the security of digital bearer assets associated with a card held by a user by ensuring personnel involved in producing the card cannot access those digital bearer assets.

Some embodiments of a manufacturing process, which may be implemented within the example computing environment 700, include at least two production teams. Some embodiments include at least a first production team that corresponds to an issuer system 730 for issuing and managing physical currency cards.

In some embodiments, a first portion of an issuer system 730 is coupled to a network 101, such as the internet. The first portion of the issuer system 730 may include a currency card API 737, such as an API configured to interface with a native application 755 executing on the devices of users of physical currency cards, like the example user device 750. In some embodiments, the currency card API 737 services requests received from native applications via user devices and returns responses, which may include results of processing the requests, to the respective user device such that the results may be displayed within the native application 755 of the user device 750 on which a user initiated the request. For example, the issuer system 730 may include, in a database 740, currency card data 745 operable to service requests received by the currency card API 737.

In some embodiments, the database 740 includes currency card data 745 operable to verify issued currency cards. Received requests to verify a currency card may be passed to a card verifier 735 which processes the request based on the currency card data 745 within the database 740 and returns a verification result to the API 737 which is transmitted to the requesting device. Thus, in some embodiments, the card verifier 735 may verify authenticity of a card based on the information provided in the received API request based on local data 745 of the database 740. In some embodiments, the card verifier 735 may store a count of requests to verify the given card within the database 740 and return the count as the verification result (e.g., as indication whether another entity had access to the card). For example, some embodiments uniquely associate, server-side, in the database 740, the unique identifier (or hash thereof) or an address (or hash thereof), and a portion of a symmetric encryption key (or hash thereof) (e.g., the first four digits). In some embodiments, a request to verify a currency card via the API 737 includes a portion of the encryption key, a unique identifier, or both, as a request to the API from a user device 750. In some embodiments, card verifier 735 performs a first verification based on local currency card data

745, such as a confirmation that the currency card is authentic by the correspondence of the received information with stored currency card data indicative of that currency card being issued. The card verifier 735 may generate a response to an API request which reports a verification value (or values). For example, a response to the API request may include a value indicative of whether the values match the set on the card (e.g., returning a binary determination where both are submitted, returning the unique identifier if the portion of the key is submitted, or returning the portion of the encryption key if the unique identifier is submitted).

In some embodiments, the card verifier 735 performs a second verification based on a decentralized computing platform data, such as a confirmation that one or more addresses associated with the card have not been previously utilized in a transaction on corresponding decentralized computing platforms. For example, some embodiments of the card verifier 735 perform one or more verification operations on a platform 760 corresponding to an address (or addresses in a set of addresses) of the card corresponding to the received API request. In some embodiments, the card verifier 735 writes a transaction to the platform indicative that a request to verify a given card was received, and may determine within the platform an associated count of requests processed for the given card, which may be returned with results to an API request for verification. Likewise, the card verifier 735 may determine a balance or amount of assets held (e.g., an amount of coins, an amount of tokens, like ERC-20 tokens, or other digital assets transacted to an address) by one or more address of a card, such as by inspection of a blockchain of a given platform 760, which may be returned in response to a balance request.

In some cases, the card verifier 735 may write the result of a verification to a decentralized computing platform or to a local database 740 for the card and initialize a count. The count for verification of a card may be incremented upon each verification request for the card received via the currency card API 737. In some embodiments, for a new currency card, the count indicates that the user is the first to verify the card and, as a result, cannot present the card as new even if a tamper-evident adhesive substrate over the concealed information 247 is replaced after such a verification.

Some embodiments include a native application 755, like a card scanning application, to manage one or more physical currency cards obtained by a user. In some embodiments, a user may utilize a user device 750 to execute a native application 755 to manage the one or more currency cards within a wallet. In some embodiments, the native application 755 generates a user interface by which the user interacts with the application. For example, the native application 755 may generate a user interface for display by retrieving an extant UI from memory, evolving an extant UI, or composing a new UI having the corresponding features. In some embodiments, the native application 755 may generate a user interface by retrieving data for one or more user interface elements from a server, such as by requesting user interface elements or populating user interface elements based on data received from an API. In some embodiments, the native application 755 generates a sequence of discrete user interfaces, or evolves a user interface to present a sequence of user interface views to displays different data or options for user selections, and may generate a different user interface or evolve a user interface or otherwise update a user interface view or information displayed within a generated user interface based on a selection of a user or received response from a server.

The native application 755 may interface with an image sensor of the user device to scan an optical code. The scanned optical code may be an optical code corresponding to a top component of a metal currency card that encodes an address (e.g., an address for receiving the transfer of ownership of a digital asset within a decentralized computing platform, like a cryptographic currency platform) based on a corresponding public key. In some embodiments, the corresponding public key resolves to various wallet addresses on various decentralized computing platforms, such as an example decentralized computing platform 760. The native application 755 may be configured to query an API 737 of a server, like an issuer system 730, with an address of a given card to query for one or more additional wallet addresses. Each wallet address may have an associated balance as indicated by transactions record in a blockchain or blockchain-like data structure (e.g., an immutable data store) of a corresponding decentralized computing platform 760. In some embodiments, the native application 755 displays a user interface including one or more representations currency cards a user has added to the wallet and one or more values indicative of digital bearer assets corresponding to the one or more addresses associated with a given representation of a currency card.

Examples of a user device 750 include computing devices like mobile computing devices such as smartphones, tablets, or laptop computers, but may also include desktop computers. In many cases, the user device 750 is a smartphone or tablet computing device having a touchscreen or other interface by which a user may view or input data, an image sensor, a wireless interface for network 101 connectivity, and optionally, a trusted execution environment. In some embodiments, a trusted execution environment is a logically or physically isolated execution environment of a user device 750 which offers increased data security, such as by cryptographic isolation, a secure co-processor or memory, or other logical or physical structure that isolates data or processes from applications or processes executed within an untrusted environment. The native application 755 may be obtained on a computer-readable medium of the user device 750 from an application repository, like an application store, or from the issuer system 730, via the network 101. Executable code of the native application 755 may be obtained in a memory of the user device 750 and executed by one or more processors of the user device 750 to perform one or more of the functions described herein.

In some embodiments, the native application 755 includes a wallet for managing physical currency cards obtained by the user. The native application 755, in example embodiments where the user device 750 includes a trusted execution environment, may interface with the trusted execution environment for the storage and processing of wallet data, like physical currency card information. Additionally, in such embodiments, the native application 755 may interface with the trusted execution environment, such as via an API of the trusted execution environment, to request that a trusted application obtain and process data corresponding to a physical currency card such that other (e.g., untrusted) applications executing on user device 750 are unable to access the data. For example, the native application 755 may request, via the API, that a trusted application within the trusted execution environment securely obtain input (e.g., via a keyboard interface or imaging interface) and process the input. In other embodiments, the native application 755 may maintain wallet data. In either instance, a user may input information corresponding to a given currency card into the native application 755 to configure the currency card within the wallet, such as by reading an optical code encoding the information with the user device 755 or inputting the information manually. The native application 755 may display a visual representation of the physical currency card within an interface and present a user interface option that the user may select to verify the currency card. Accordingly, in some embodiments, the native application 755 may present a user interface by which a user may elect to read an optical code corresponding to a physical currency card. The native application 755 may interface with an imaging device, like an image sensor, of the user device 750 to capture an image of the optical code. In turn, the native application 755 may process the image to obtain (e.g., read) the information that was encoded in the optical code. Alternatively, a user may manually input the information.

The native application 755 may prompt a user to input or obtain via an image sensor additional associated information in response to reading a given optical code or selection of a function, such as a verification code, encryption key, etc., depending on the optical code or the activity the user desires to effect. For example, an optical code may be read to obtain an address or public key corresponding to a physical currency card, and the native application 755 may display a representation of the physical currency card with the address, public key, or one or more other addresses (e.g., corresponding to different decentralized computing platforms or different cryptographic currencies). The user may elect to verify the currency card by selecting a user interface element within the native application 755 to verify the card. In response to the selection, the native application 755 may prompt the user for a verification code (or other information, like a unique identifier of the card) and, after obtaining verification code input, transmit a request to the API 37 of the issuer system 730. In some embodiments, the request includes one or more of a verification code (e.g., a portion of an encryption key) of a currency card, address encoded by the optical code on the currency card, and unique identifier of the currency card. In some embodiments, the native application 755 cryptographically hashes a combination of the above described data and transmits the cryptographic hash rather than the data itself. For example, the native application 755 may concatenate the verification code and address into an alphanumeric string, cryptographically hash the string, and transmit the cryptographic hash of the string or portion thereof for verification. In turn, the native application 755 may receive a response from the issuer system 730 indicating a result of the verification, such as verified, and optionally whether a prior verification request has been serviced for the currency card. In some embodiments, the native application 755 may additionally request information from one or decentralized computing platforms 760, such as a request for transactions associated with a given address corresponding to the currency card, and provide the results to the user (e.g., whether the address was previously utilized in a transaction, thereby indicating a possible collision or that another user has utilized at least the same address or public key corresponding to the card). Based on the results of the one or more verifications, a user can easily determine whether to utilize the physical currency card (e.g., by the access information disposed thereon) to manage (or hold) digital bearer assets on a decentralized computing platform 760.

In another example, a user may desire to transfer digital bearer access and select a corresponding user interface option within the native application 755. In turn, an optical code may be read to obtain an address or public key to which the user desires to transfer digital bearer assets or the user may manually input the address or public key. The native application 755 may display a representation of one or more physical currency cards within the wallet of the user that are operable to effect the transfer. For example, the native application 755 may display a subset of the physical currency cards within the wallet that have digital bearer assets of the desired type and the amount of the access held by that card. In turn, a user may elect to effect a transfer with one or more of the physical currency cards. For example, the user may select a given representation of a currency card having a sufficient balance to effect the transfer. In response, the native application 755 may prompt the user to provide private access information corresponding to that physical currency card. In some embodiments, the native application 755 prompts the user to utilize the image sensor to read an optical code encoding the private access information. Alternatively, the user may manually input the private access information. In some embodiments, the private access information encoded in an optical code or otherwise printed on a physical currency card is a ciphertext of private access information which must be decrypted to obtain plaintext of private access information for effecting the transfer. Accordingly, the native application 755 may detect that input private access information is ciphertext (e.g., based on a format of encoded ciphertext, like a prefix, or the format differing from a format of a private key operable to effect a transfer) and request input of an encryption key or passphrase by which the ciphertext private access information can be decrypted to obtain plaintext private access information. For example, the native application 755 may prompt the user to scan another optical code encoding the encryption key or manually input the encryption key such that the ciphertext can be decrypted and the private key obtained. If the user elects to commit the transfer, the native application 755 may generate transaction information according to a protocol of a decentralized computing platform 760 corresponding to the digital bearer asset. Generally, the process includes a signature over the transaction information with the private key (e.g., obtained by decrypting the ciphertext private access information with the encryption key or passphrase) that corresponds to the public key backing an address to which the digital bearer assets are being transferred from. For example, data, like the amount of digital bearer assets being transferred and the recipient address(es) (among other information), may be digitally signed with a signature algorithm utilizing the private key, and the signature over the data may be verifiable with a signature verification algorithm utilizing the public key. Thus, for example, the transaction information may include the data that was signed, the signature, and the public key by which the signature can be verified and that resolves to an address holding at least the amount of digital bearer assets being transferred.

In some embodiments, a second portion of an issuer system 730 includes a currency card generator 733. In some embodiments, the currency card generator 733 is a cold computing server or system without access to a network 101, such as the internet (e.g., to increase security, though a configuration having network access is not disclaimed). In some embodiments, the currency card generator 733 is a secure computing component or system configured to generate currency card information, such as key-pairs, like a private-public key pair. In some embodiments, the secure component 733 also generates an encryption key for each key pair and encrypts the private key with the corresponding encryption key (e.g., to generate a ciphertext of the private key). In some embodiments, the secure component 733 generates an address, like a cryptographic hash address for a decentralized computing platform, and in some cases may generate a set of address where at least some of the different addresses correspond to different decentralized computing platforms or digital bearer assets on a decentralized computing platform. In some embodiments the currency card generator 733 assigns a unique identifier to a set of informational components corresponding to a given currency card. For example, a unique identifier, like a serial number, may be associated with an address or set of addresses (or public key upon which the addresses are based), ciphertext of a private key, and an encryption key.

In some embodiments, the currency card generator 733 outputs different combinations of informational components for a currency card in different files (e.g., segments generated information into different files), and those different files may be provided to different systems in a manufacturing process. In some embodiments, the informational components are segmented into at least two parts and those parts are individually inoperable to obtain plaintext of a private key backing a currency card. For example, a first information component (e.g., a first file) may correspond to a printing system 710 and include sticker data 715 for printing stickers (or components of a multi-component sticker). In some embodiments, the first file includes a unique identifier, address (e.g., public access information for a first component), and ciphertext (e.g., ciphertext of private access information for a second component) for each sticker (or components of a multi-component sticker). A second information component (e.g., a second file) may correspond to a card system 720 and include card blank data 725 for engraving (or otherwise disposing information) card blanks. In some embodiments, the second file includes a unique identifier and an encryption key (e.g., the encryption key utilized to generate ciphertext of private access information corresponding to the unique identifier) for each card blank to be engraved. In an alternative embodiment, the second file may include a unique identifier and ciphertext of private access information (with the card issuer retaining the encryption key for a final engraving step completed by the issuer, such as in a third file comprising a unique identifier or address and a corresponding encryption key). In another alternative embodiment, the card issuer may retain the card blank data 725 and perform each engraving step (although, in some configurations, it may be beneficial to have a separate party with a card system 720 perform at least some of the engraving such that no single group, party, or personnel has access to information operable to obtain private access information, like a private key, in plaintext without physically activating a tamper-evident feature of a card).

In some embodiments, the currency card generator 733 generates one or more addresses for a public-private key-pair based on the public key of the key pair. In some embodiments, a set of addresses is generated, each address in the set generated according to a protocol of a given decentralized computing platform 760, such as for a corresponding set of different decentralized computing platforms. In some embodiments, the set of addresses and a unique identifier or hash of information corresponding to the card (e.g., unique identifier concatenated with a portion of an encryption key) are stored within a database 740 for supporting utilization of currency cards via a user device 750. A primary address for a given platform, such as platform 760, on which the primary address is operable may be selected for printing as public access information on a sticker for a currency card and included in sticker data 715 provided to a printing system 710. The other addresses in the set of addressed may be stored in association with the primary address or other identifier or combination thereof. For example, the currency card generator 733 may store in the database 740, or within a file utilized to populate the database, associations based on the generated data. Further, with a set of addresses generated, the currency card generator 733 may discard the public key utilized to generate the addresses, and further, may also discard any plaintext private keys during the segmenting of data. An address need only be considered primary in the sense that it is an address selected for inclusion with an issued currency card. In addition, in some embodiments, a primary address may be selected by generating that address for a given platform and other addresses for other platforms (e.g., those not selected) may be generated later and optionally separately. That is to say, the full set of addresses need to be generated to select a primary address as each address may be deterministically generated based on a public key in a different sequence or by different systems (e.g., prior to discarding information operable to obtain a public key that corresponds to the private key).

In some embodiments, the associations stored within the database 740 or elsewhere are in-themselves inoperable to obtain a private key in plaintext. Thus, for example, once the printing system 710, card system 720, or issuer system 730 complete an associated operation and discard an encryption key (e.g., after engraving of a card and concealing of the encryption key with a tamper-evident component) or ciphertext of a private key (e.g., after creation or application of a sticker or otherwise concealing of the ciphertext by a tamper-evident component), attempts to ascertain the private key in plaintext will be evident and only the card itself will include disposed thereon the set of information operable to obtain the private key in plaintext. Thus, for example, the database 740 may store in currency card data 745, a record for each currency card that contains the unique identifier or verification code (e.g., a portion of the encryption key), or a cryptographic hash thereof or other representation, and the set of addresses without storing either the public or the private key. In other words, public keys and private keys may be discarded for security (although some embodiments may retain a public key, but the public key may be optionally encrypted based on information or a combination of information that is discarded by the systems but resident on the currency card such that public key may be obtained by the user without accessing the private key). As such, a currency card API 737 may respond to API requests for verification of a currency card and balance of addresses associated with the currency card in addition to the primary address. The API 737 may pass verification request to the card verifier 735 component to receive a result and provide the result to the user device. For example, the currency card API 737 may response to requests received from a native application 755 executing on the user device 750 of a user having obtained a currency card.

In some embodiments, the example computing environment 700 is configured to implement a manufacturing process like that disclosed below using one or more of the above described components. As mentioned above, various ones of the functions of the printer system 710, card system 720, or issuer system 730 may be further subdivided and decentralized amongst different parties to mitigate supply chain attacks. For example, a team responsible for currency card generation 733 may be geographically remote or otherwise isolated from another team responsible for generating some other currency card information based on output of the currency card generator 733, and those respective teams may interact with a respective system (e.g., printing system or card system) in the manufacturing process. Further, the printer system and card system, and the team (or teams) responsible for currency card information generation may be further divided into sub-teams for key generation (e.g., a team may be responsible for passphrases and encryption keys by which an intermediate code may be provided to another team for generating a ciphertext private key or other information, and the like, and may communicate with a respective component, e.g., printer component 710 or card component 720, but not each other).

In some embodiments, the printing system 710 of the tamper-evident sticker never has access to the plaintext of the secret key because an encrypted representation is utilized. Thus, for example, information for sticker 715 printing may include, for each sticker, a unique identifier like a serial number, address/address optical code, and ciphertext private key/ciphertext private key optical code. As the sticker manufacturer need not take possession of an encryption key operable to decrypt the ciphertext private key or the card blanks marked with the encryption key, the sticker manufacturer cannot ascertain the secret information backing the account corresponding to the addresses or public key.

In some embodiments, the card system 720 of the currency card blanks never has access to the ciphertext of the private key (physically or without tamper-evidence in the sticker concealing the ciphertext of the private key). Thus, for example, card blank information 725 may include, for each card, a unique identifier and an encryption key. As the card blank manufacturer does not take possession of the ciphertext of the private key, the manufacturer 720 is prevented from using the encryption key in a nefarious manner.

In some embodiments, security may be increased by a final engraving step performed by the card issuer system 730 rather than the card blank manufacturer. For example, the card issuer system 730 may detect a given instance of a card and append a remaining portion of an encryption key to a verification code portion or identify the card (e.g., based on the primary address or unique identifier) and engrave the encryption key. Thus, for example, even collusion between both the sticker manufacturer and card blank manufacturer is insufficient to nefariously gain access to a secret key generated by a card issuer.

An example manufacturing process may include, in accordance with the above described embodiments, a first production team (e.g., at a first facility) that generates private key information (or seeds for private keys) and another, geographically independent, team (e.g., at a second facility) that generates encryption key information (or passphrases) for encrypting private keys. In some embodiments, a currency card generator 733 may receive as input private key information and encryption key information, and output, in separate files, on separate storage media, the information described above. For example, in some embodiments, the currency card generator 733 selects private key information and encryption key information, operates on the private key information to generate a private key and operates on the encryption key information to generate an encryption key, neither of which as a result of the operations directly match the input information to prevent any value of a nefarious party attempting to retain the input information. The currency card generator 733 segments the outputs into different files, such as a first file corresponding to sticker data 715 (e.g., a primary address, ciphertext private key, and unique identifier), a second file corresponding to card blank data 725 (e.g., a unique identifier and encryption key), and a third file corresponding to currency card data 745 (e.g., unique identifier, verification code portion of the encryption key, and address set for user verification or obtaining additional addresses) for the respective system. The different files may be generated on different storage media, such that those different media may be provided to the corresponding systems.

An example manufacturing process may include, in accordance with the above described embodiments, a first production team (e.g., at a first facility) that generates sticker components with a printing system 710 based on sticker data 715 and another, geographically independent, team (e.g., at a second facility) that generates card blanks with a card system 720 based on card blank data 725. In some embodiments, a third production team (e.g., at a third facility) is utilized. For example, the third production team may receive stickers generated with sticker data 715, apply the stickers to card blanks prior to an engraving step, and subsequently provide the card blanks having the sticker applied thereon to a card system 720 for engraving based on card blank data 725. Alternatively, the third production team may apply stickers to corresponding cards based on a matching of unique identifiers between stickers and engraved card blanks. In other words, embodiments of the manufacturing process may be implemented such that no production teams gains access to both encryption keys and ciphertext private key (e.g., physically or by visual inspection without tripping a tamper evident indicator).

Some embodiments of the currency card generator 733 and other aspects of the manufacturing process implement key generation and encryption processes like those set out in the BIP38 standard in the making of a physical cryptocurrency wallet such that multiple informational components (e.g., ciphertext of a private key and corresponding encryption key) are required to access a private key. In some embodiments, the encryption key may include a verification code portion and a remaining portion, which may optionally be separated and one or the other (or both) engraved in a final step prior to packaging to further prevent a nefarious party gaining access to the information components operable to obtain a plaintext private key. Some embodiments afford a cryptocurrency storage solution that makes use of a key generation and encryption process that reduces security leaks in the manufacturing process by having different steps in the process take place across two geographically isolated manufacturing locations, and the sequence with which tamper-evident components are disposed on the product prevent a given party from obtaining access to informational components operable to obtain a plaintext private key without activating a tamper-evident feature.

In some embodiments, a first production team in the United States or other locations generates an encryption key or passphrase for decrypting a particular cryptocurrency private key. The first team then utilizes the encryption key to generate an intermediate code, which can be used by another party to generate an encrypted private key, a public key, and a public address. For example, the currency card generator 733 may be utilized to generate the encryption key and the intermediate code (e.g., like a proxy encryption code). The encryption key is retained for card blank data 725, and the proxy encryption code may be utilized by a separate, second, production team to generate an ciphertext private key, addresses that resolve to a public key based on a plaintext private key (e.g., when the ciphertext private key is decrypted by the encryption key). In some embodiments, the intermediate code cannot, however, be used to gain access to the encryption key needed to decrypt the ciphertext private key, or otherwise gain access to the private key in plaintext.

In some embodiments, the first team then gives the intermedia code to a second team in Asia or other locations, or the intermedia code may be utilized in a second process to generate and store the information on a separate storage medium. The first team and second team need not necessarily be geographically remote, as other isolation techniques may be utilized. For example, a first team may be walled off from a second team during a manufacturing cycle (e.g., of a batch of a component of a cryptocurrency card), and respective terminals or computing systems may purge data for a batch of a component, such as to prevent any cross-referencing of secret passphrases, private keys, or intermediate codes. A batch of a component, like a batch of stickers, may be manufactured over a set timeframe (e.g., a over a shift, like 4 or 8 hours), after which the team responsible for the batch may purge the corresponding data (e.g., to receive data for manufacturing the next batch).

In some embodiments the encrypted private key, which may be printed on bottom-component of a multi-component sticker, is encased by a top-component of the multi-component sticker on which the primary address is printed. The top-component may include one or more tamper-evident features such that, once the bottom-component is so encased by the top-component, a party cannot access the ciphertext of the private key without activating one or more of the features. Once the multi-component sticker that has the encrypted private key printed on the bottom-component and the primary address printed on the top-component is adhered to the card, with the top-component positionally encasing the bottom-component (e.g., which may be visually evident based on a window in the top-component revealing an area of the bottom-component that corresponds to the window), a party in possession of the card cannot ascertain the ciphertext of the private key. In other words, the bottom-component containing the ciphertext of the private key cannot be accessed or viewed without shifting or removing the top-component. If the top-component is removed or shifted, even slightly, in an attempt to access the ciphertext of the private key, a clearly visible honeycomb-like or other pattern (e.g., in a three-dimensional relief pattern) may be revealed on the card, and the top-component cannot be re-adhered to a surface with its original appearance.

When generating the ciphertext private key, the public key, and primary address (or set of addresses) with an intermedia code, in some embodiments, the second production team also generates a confirmation code that is returned to the first team. The first team may use the confirmation code to verify that the primary address the second production team generated depends on the encryption key or passphrase the first team generated (and, therefore, is operable to decrypt the ciphertext private key the second team generated with the intermedia code). In some embodiments, although the first team receives a confirmation code from the second team, the first team need not receive or access the ciphertext private key at any point and therefore cannot access the plaintext private key without removing the tamper-evident top-component of a multi-component sticker once the sticker data 715 is discarded. Likewise, the reverse holds true once the card blank data 725 including the encryption key is discarded (e.g., after confirmation and engraving of card blanks with corresponding information to sticker information).

Although the second team generates the encrypted private key, the public key and the public address, it does not have the ability to decrypt the encrypted private key because it only has access to an intermediate code in this example. The second team never has access to the secret passphrase needed to decrypt the private key in some embodiments. In some embodiments, after attaching a ciphertext private key and public address onto a card via a multi-component sticker, the second team sends the card to the first team. The first team then attaches the encryption key needed to decrypt the ciphertext private key onto the card and ships the card to customers and distributors. In this way, in these embodiments, the second team never gains access to the encryption key needed to decrypt the ciphertext private key and access funds on the card. The first team also cannot access the ciphertext private key for decryption without moving or removing a sticker component concealing the ciphertext private in a tamper evident manner.

Provided the tamper-evident sticker component encasing the private key has not been tampered with (which the customer can easily see), and the tamper-evident component masking the encryption key has not been tampered with, the user of the physical currency card can be assured that no one in the whole manufacturing and supply chain process accessed both the encryption key and the ciphertext private key to obtain the plaintext private key of the card. This is expected to guarantee the integrity of the card and enhances the security of digital bearer assets a user transfers to the card.

Thus, for example, various ones of the printer system 710, card system 720, and issuer system 730, may be operated by different teams, and a system may be further subdivided into two or more components or systems operated by two or more teams, such as in accordance with the manufacturing process techniques to enhance security in cryptographic currency cards as described above. Moreover, one or more of the systems 710, 720, 730 may be a cold system or include one or more cold components not accessible from a network 101 (although exchange of data over a network 101 between the different system in a secure manner is not disclaimed, such as by asymmetric cryptography by which only a given party can access a corresponding portion of encrypted data which itself may be encrypted).

Figure 8:
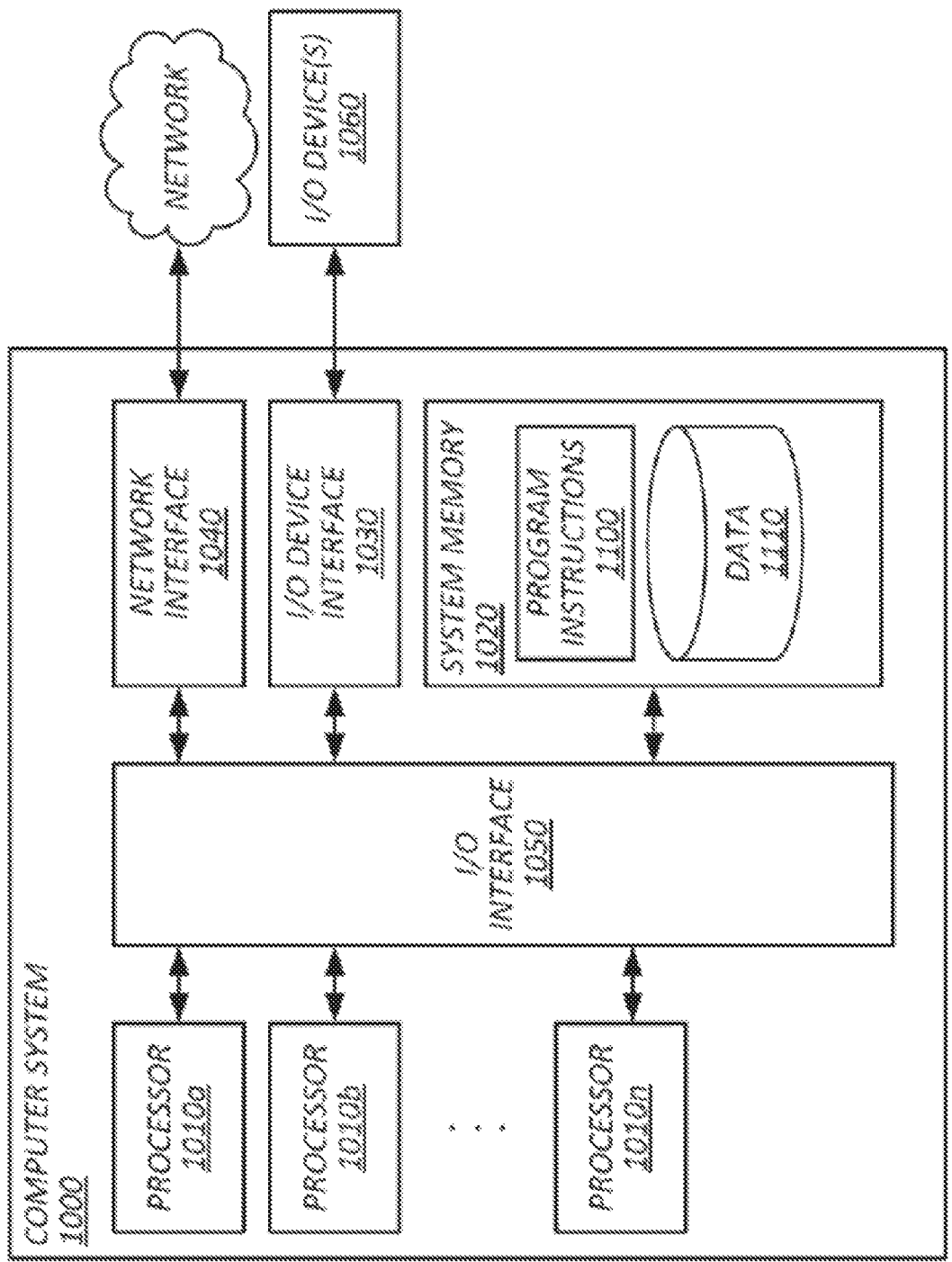
FIG. 8 illustrates an example computing system in accordance with embodiments of the present techniques.

FIG. 8 illustrates an example computing system 1000 in accordance with embodiments of the present techniques. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010*a*-1010*n*) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010*a*), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems, which may also be decentralized) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically or among different parties (e.g., decentralized)), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call, and arguments (e.g., in a request) or corresponding result (e.g., in a response) may be wholly or partially communicated (e.g., arguments may be communicated over one or more requests and results may be communicated in one or more responses, which need not have direct correspondence). Similarly, reference to "a computer system" performing step A and "the computer system" performing step B can include the same computing device within the computer system performing both steps or different computing devices within the computer system performing steps A and B.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

Example enumerated embodiments disclosed above include, but are not limited to, the following embodiments:
1. A tangible, non-transitory, machine-readable medium storing instructions that when executed by one or more processors effectuate operations that facilitate multi-address access from a single address of a physical currency card, the operations comprising: deterministically generating, with a computer system, a public cryptographic key based on information corresponding to a private cryptographic key, the public cryptographic key and private cryptographic key being members of an asymmetric encryption cryptographic key pair; deterministically generating, with the computer system, a set of addresses based on the public cryptographic key, each of at least a plurality of addresses in the set of addresses corresponding to a different user account of a different decentralized computing platform; selecting, with the computer system, from the set of addresses, a primary address to be depicting on a physical card that also depicts information from which the private cryptographic key is accessible; deterministically generating, with the computer system, a record identifier, the record identifier corresponding to the physical card and being based on information resident on the physical card other than the private key or the public key; storing, with the computer system, within a database, a record associated with the record identifier, the record comprising the set of addresses or information from which the set of addresses is derivable; receiving, with the computer system, from a user computing device, a request for an additional address, the request uniquely identifying the record identifier; and transmitting, with the computer system, to the user device, a response including one or more addresses in the set of addresses different from the primary address.
2. The medium as disclosed above wherein: generating the public cryptographic key based on information corresponding to the private cryptographic key comprises generating the public cryptographic key without access to the private cryptographic key.
3. The medium as disclosed above wherein: the public cryptographic key is generated based on an intermediate code and ciphertext corresponding to the private cryptographic key.
4. The medium as disclosed above wherein: the record identifier is based on verification code disposed on the physical card and a unique identifier disposed on the physical card.
5. The medium as disclosed above wherein the operations further comprise: obtaining, from the database, the record associated with the record identifier; updating, in response to obtaining the record, a request count associated with the record; and transmitting, to the user device, an indication of the request count in the response.
6. The medium as disclosed above wherein: updating the request count associated with the record comprises initializing or increasing the request count.
7. The medium as disclosed above wherein: updating the request count associated with the record comprises causing a decentralized computing platform corresponding to the primary address to store the indication of the request count in association with the primary address.

8. The medium as disclosed above wherein: requesting, based on the record identifier, a corresponding record from the database comprises requesting a record within an immutable data store of a decentralized computing platform.

9. The medium as disclosed above wherein the user computing device executes a native application configured to: scan the primary address disposed on the physical card; generate the request without obtaining the private cryptographic key or public cryptographic key corresponding to the physical card; and associate, in response to receiving the response, the one or more addresses in the set of addresses different from the primary address with a wallet account corresponding to the physical card.

10. The medium as disclosed above wherein the native application is further configured to: generate a user interface displaying a representation of the physical card and one or more other scanned physical cards; and determine a balance associated with each scanned physical card across a plurality of addresses received for the respective scanned physical card.

11. The medium as disclosed above wherein the native application is further configured to: receive a selection of a representation of a given scanned physical currency card; and generate a user interface displaying balances for respective addresses associated with the given scanned card.

12. The medium as disclosed above wherein the native application is further configured to: receive a selection of a representation of a given scanned physical card; and generate a user interface displaying balances for respective addresses associated with the given scanned card.

13. The medium as disclosed above wherein the operations further comprise: determining the private cryptographic key by generating a value with more than 128 bits of entropy.

14. The medium as disclosed above wherein: the record comprises information from which the set of addresses is derivable; and the operations further comprise deriving at least one address among the set responsive to the request for additional addresses based on at least some of the information from which the set of addresses is derivable.

15. The medium as disclosed above wherein the operations further comprise: steps for deriving a plurality of addresses from a single value.

16. The medium as disclosed above wherein the operations further comprise: providing the physical card.

17. The medium as disclosed above wherein the operations comprise: forming a first address among the set of addresses based on a Keccak-256 hash that is based on the public cryptographic key; forming a second address among the set of addresses based on a RIPEMD-160 hash of a SHA-256 hash that is based on the public cryptographic key, the second address also being based on a checksum based on the RIPEMD-160 hash, and the second address having a Base58 encoding based on a first dictionary; and forming a third address among the set of addresses with a Base58 encoding and a checksum that are both based on the public cryptographic key, the Base58 encoding of the third address being based on a second dictionary that is different from the first dictionary.

18. The medium as disclosed above wherein the operations further comprise: deriving at least some of the set of addresses based on the information from which the set of addresses is derivable in response to the request.

19. The medium as disclosed above wherein: the set of addresses are derived and stored in the database prior to receiving the request.

20. A computer-implemented method comprising the above described operations.

21. A computer-based system or systems implementing the above described operations of the medium.

What is claimed is:

1. A method, comprising:
obtaining, with a computer system at a first geolocation, a passphrase;
generating, with the computer system at the first geolocation, an intermediate code based on the passphrase, wherein:
the intermediate code does not reveal the passphrase, and
the intermediate code is configured to be used to encrypt plaintexts to form ciphertexts that are decryptable with the passphrase;
obtaining, with a computer system at a second geolocation, the intermediate code and a private cryptographic key of a public-private cryptographic key pair, wherein:
the second geolocation is different from the first geolocation,
the computer system at the second geolocation does not have access to the passphrase, and
the public-private cryptographic key pair comprises a public cryptographic key that corresponds to a wallet address of a decentralized computing platform;
forming, with the computer system at the second geolocation, an encrypted-private-key ciphertext by encrypting the private cryptographic key with the intermediate code;
printing the encrypted-private-key ciphertext on a first substrate, wherein:
the encrypted-private-key ciphertext does not reveal the private cryptographic key, and
the encrypted-private-key ciphertext is decryptable with the passphrase to reveal the private cryptographic key in plaintext;
printing, at a different geolocation from where printing the encrypted-private-key ciphertext on the first substrate occurs, the passphrase on a second substrate;
concealing the passphrase printed on the second substrate or the encrypted-private-key ciphertext printed on the first substrate with a tamper-evident mask;
after concealing the passphrase printed on the second substrate or the encrypted-private-key ciphertext printed on the first substrate with a tamper-evident mask, obtaining the first substrate and the second substrate at the same geolocation, wherein:
people and computer systems with access to the passphrase do not have access to the encrypted-private-key ciphertext without tampering with the tamper-evident mask, or
people and computer systems with access to the encrypted-private-key ciphertext do not have access to the passphrase without tampering with the tamper-evident mask; and
attaching the first substrate to the second substrate.

2. The method of claim 1, wherein:
the first substrate or the second substrate is a metal card.

3. The method of claim 2, wherein:
the encrypted-private-key ciphertext or the passphrase is printed on the metal card by engraving.

4. The method of claim 1, wherein:
the first geolocation is in a first country;
the second geolocation is in a second country that is different from the first country;
printing the encrypted-private-key ciphertext does not occur in the first country; and
printing the passphrase on the second substrate does not occur in the second country.

5. The method of claim 1, wherein:
the first substrate with the encrypted-private-key ciphertext and the second substrate with the passphrase are not in the same country before concealing the passphrase printed on the second substrate or the encrypted-private-key ciphertext printed on the first substrate with a tamper-evident mask.

6. The method of claim 1, wherein:
the first substrate is a card;
the second substrate is a sticker; and
the tamper-evident mask comprises means for indicating tampering.

7. The method of claim 1, wherein:
the first substrate is a sticker;
the second substrate is a card; and
the tamper-evident mask comprises means for indicating tampering.

8. The method of claim 1, wherein:
generating the intermediate code comprises generating a proxy re-encryption code.

9. The method of claim 1, wherein:
the encrypted-private-key ciphertext is not decryptable with the intermediate code to reveal the private key in plaintext.

10. A method, comprising:
obtaining, with a computer system at a first geolocation, a passphrase;
generating, with the computer system at the first geolocation, an intermediate code based on the passphrase, wherein:
the intermediate code does not reveal the passphrase, and
the intermediate code is configured to be used to encrypt plaintexts to form ciphertexts that are decryptable with the passphrase;
obtaining, with a computer system at a second geolocation, the intermediate code and a private cryptographic key of a public-private cryptographic key pair, wherein:
the second geolocation is different from the first geolocation,
the computer system at the second geolocation does not have access to the passphrase, and
the public-private cryptographic key pair comprises a public cryptographic key that corresponds to a wallet address of a decentralized computing platform;
forming, with the computer system at the second geolocation, an encrypted-private-key ciphertext by encrypting the private cryptographic key with the intermediate code;
printing the encrypted-private-key ciphertext on a first substrate, wherein:
the encrypted-private-key ciphertext does not reveal the private cryptographic key, and
the encrypted-private-key ciphertext is decryptable with the passphrase to reveal the private cryptographic key in plaintext;
printing, at a different geolocation from where printing the encrypted-private-key ciphertext on the first substrate occurs, the passphrase on a second substrate, wherein
the first geolocation is in a first country, the second geolocation is in a second country that is different from the first country, printing the encrypted-private-key ciphertext does not occur in the first country, and printing the passphrase on the second substrate does not occur in the second country;
concealing the passphrase printed on the second substrate or the encrypted-private-key ciphertext printed on the first substrate with a tamper-evident mask;
after concealing the passphrase printed on the second substrate or the encrypted-private-key ciphertext printed on the first substrate with a tamper-evident mask, obtaining the first substrate and the second substrate at the same geolocation; and
attaching the first substrate to the second substrate.

11. The method of claim 10, wherein:
the first substrate or the second substrate is a metal card.

12. The method of claim 11, wherein:
the encrypted-private-key ciphertext or the passphrase is printed on the metal card by engraving.

13. The method of claim 10, wherein:
the first substrate is a card;
the second substrate is a sticker; and
the tamper-evident mask comprises means for indicating tampering.

14. The method of claim 10, wherein:
the first substrate is a sticker;
the second substrate is a card; and
the tamper-evident mask comprises means for indicating tampering.

15. The method of claim 10, wherein:
generating the intermediate code comprises generating a proxy re-encryption code.

16. The method of claim 10, wherein:
the encrypted-private-key ciphertext is not decryptable with the intermediate code to reveal the private key in plaintext.

17. A method, comprising:
obtaining, with a computer system at a first geolocation, a passphrase;
generating, with the computer system at the first geolocation, an intermediate code based on the passphrase, wherein:
the intermediate code does not reveal the passphrase, and
the intermediate code is configured to be used to encrypt plaintexts to form ciphertexts that are decryptable with the passphrase;
obtaining, with a computer system at a second geolocation, the intermediate code and a private cryptographic key of a public-private cryptographic key pair, wherein:
the second geolocation is different from the first geolocation,
the computer system at the second geolocation does not have access to the passphrase, and
the public-private cryptographic key pair comprises a public cryptographic key that corresponds to a wallet address of a decentralized computing platform;
forming, with the computer system at the second geolocation, an encrypted-private-key ciphertext by encrypting the private cryptographic key with the intermediate code;
printing the encrypted-private-key ciphertext on a first substrate, wherein:
the encrypted-private-key ciphertext does not reveal the private cryptographic key, and the encrypted-private-key ciphertext is decryptable with the passphrase to reveal the private cryptographic key in plaintext;
printing, at a different geolocation from where printing the encrypted-private-key ciphertext on the first substrate occurs, the passphrase on a second substrate;
concealing the passphrase printed on the second substrate or the encrypted-private-key ciphertext printed on the first substrate with a tamper-evident mask, wherein the first substrate with the encrypted-private-key ciphertext and the second substrate with the passphrase are not in the same country prior to the concealing;
after concealing the passphrase printed on the second substrate or the encrypted-private-key ciphertext printed on the first substrate with a tamper-evident mask, obtaining the first substrate and the second substrate at the same geolocation; and
attaching the first substrate to the second substrate.

18. The method of claim 17, wherein:
the first substrate or the second substrate is a metal card.

19. The method of claim 18, wherein:
the encrypted-private-key ciphertext or the passphrase is printed on the metal card by engraving.

20. The method of claim 17, wherein:
the first substrate is a card;
the second substrate is a sticker; and
the tamper-evident mask comprises means for indicating tampering.

21. The method of claim 17, wherein:
the first substrate is a sticker;
the second substrate is a card; and
the tamper-evident mask comprises means for indicating tampering.

22. The method of claim 17, wherein:
generating the intermediate code comprises generating a proxy re-encryption code.

23. The method of claim 17, wherein:
the encrypted-private-key ciphertext is not decryptable with the intermediate code to reveal the private key in plaintext.

* * * * *